(12) United States Patent
Ohsawa et al.

(10) Patent No.: US 6,907,517 B2
(45) Date of Patent: Jun. 14, 2005

(54) INTERPROCESSOR REGISTER SUCCESSION METHOD AND DEVICE THEREFOR

(75) Inventors: Taku Ohsawa, Tokyo (JP); Satoshi Matsushita, Tokyo (JP)

(73) Assignee: NEC Corporation, Tokyo (JP)

( * ) Notice: Subject to any disclaimer, the term of this patent is extended or adjusted under 35 U.S.C. 154(b) by 406 days.

(21) Appl. No.: 10/163,505

(22) Filed: Jun. 7, 2002

(65) Prior Publication Data

US 2003/0028755 A1 Feb. 6, 2003

(30) Foreign Application Priority Data

Jul. 12, 2001 (JP) ........................................ 2001-212248

(51) Int. Cl.$^7$ ............................................. G06F 9/40
(52) U.S. Cl. ....................................................... 712/216
(58) Field of Search ........................................ 712/216

(56) References Cited

U.S. PATENT DOCUMENTS

| | | | | |
|---|---|---|---|---|
| 5,430,850 A | * | 7/1995 | Papadopoulos et al. | 719/314 |
| 5,560,029 A | * | 9/1996 | Papadopoulos et al. | 712/25 |
| 5,717,926 A | | 2/1998 | Browning et al. | |
| 5,913,059 A | | 6/1999 | Torii | |
| 6,330,661 B1 | * | 12/2001 | Torii | 712/228 |
| 6,389,446 B1 | * | 5/2002 | Torii | 718/100 |
| 6,766,517 B1 | * | 7/2004 | Bernardo | 719/313 |

FOREIGN PATENT DOCUMENTS

| | | |
|---|---|---|
| EP | 0725334 | 7/1996 |
| EP | 0 725 334 A1 | 8/1996 |
| JP | 10-027108 | 1/1998 |
| JP | 10-78880 | 3/1998 |
| JP | 10-078880 | 3/1998 |
| JP | 10-187464 | 7/1998 |
| JP | 2002-163105 | 6/2002 |

OTHER PUBLICATIONS

Sohi et al., "Multiscalar Processors," The 22$^{nd}$ Annual International Symposium on Computer Architecture, Conference Proceedings, IEEE Computer Society Press, Jun. 22–24, 1995, pp. 414–426.

Kobayashi et al., "SKY: A Processor Architecture That Exploits Instruction–Level Parallelism in Non–Numerical Applications," Joint Symposium on Parallel Processing 1998, IPSJ Symposium Series, vol. 98, No. 7, Jun. 3, 1998pp. 87–94.

Torri et al., "Control Parallel On–Chip Multi–Processor: MUSCAT," Joint Symposium on Parallel Processing 1997, May 28, 1997, pp. 229–236.

Torii, Sunao et al., Proposal for a MUSCAT on–chip control parallel processor. *Jōhō Shori Gakkai Ronbunshi* [Papers of the Information Processing Society], Japan, Information Processing Society, Jun. 1998, vol. 39, No. 6, pp. 1622–1631.

(Continued)

*Primary Examiner*—Eric Coleman
(74) *Attorney, Agent, or Firm*—Foley & Lardner LLP

(57) ABSTRACT

In a parallel processor system for executing a plurality of threads which are obtained by dividing a single program in parallel each other by a plurality of processors, when a processor executing a master thread conducts forking of a slave thread in other processor, at every write to a general register in the master thread after forking, the fork source processor transmits an updated register value to the fork destination processor through a communication bus. The fork destination processor executes the slave thread for speculation and upon detecting an offense against Read After Write (RAW) related to the general register, cancels the thread being executed to conduct re-execution of the thread.

28 Claims, 14 Drawing Sheets

OTHER PUBLICATIONS

Osawa, Taku et al., Investigation of the mixed thread execution scheme under MUSCAT. *Jōhō Shori Gakki Kenkyū Hōkoku* [Information Processing Society Research Reports], Japan, Information Processing Society, Aug. 4, 1999, vol. 99, No. 67, pp. 169–174.

Sakai, Junji et al., Automatic parallelized compiling techniques for control parallel architecture. 1998 Parallel Processing Symposium, Information Processing Society, Jun. 3, 1998, vol. 98, No. 7, pp. 383–390.

* cited by examiner

FIG. 1
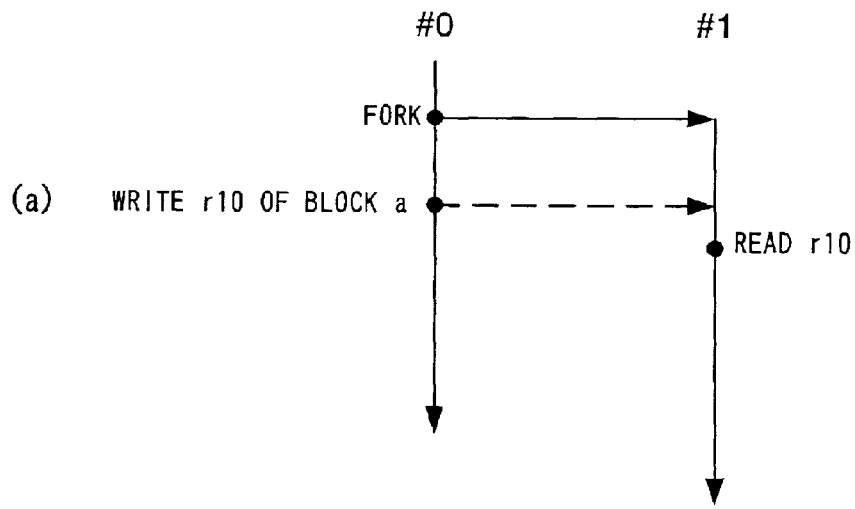
(a)
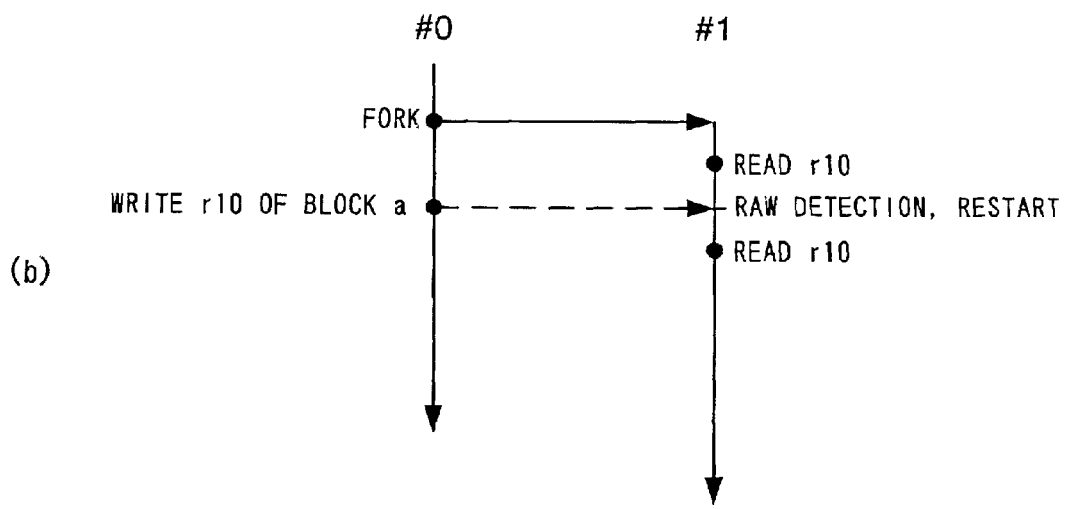
(b)
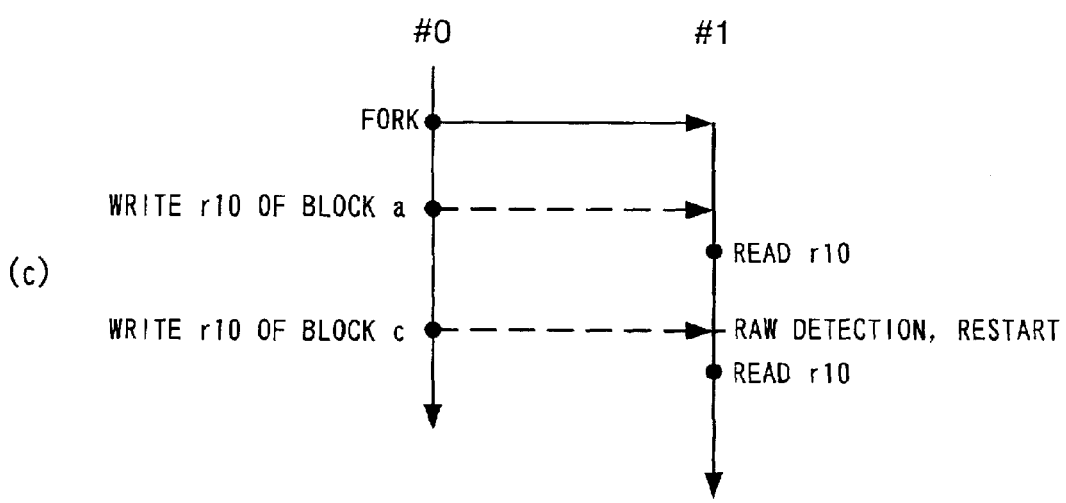
(c)

FIG. 6

(a)
```
        fork    _th1
        add     r20,r20,1
        jal     _func
        add     r20,r20,1
        jal     _func
_th1:
        add     r13,r20,1
        :

_func;  subu    sp, 24
        sw      r20,20(sp)      ;TO SAVE r20
        :
        move    r20,r0          ;SWITCH OF r20 CONTENTS
        :
        lw      r20,20(sp)      ;TO RETURN r20
        addu    sp,24
        j       r31
```

(b)
```
        fork    _th1
        add     r20,r20,1
        prop    !r20            ;TO HALT TRANSFER OF r20
        jal     _func
        prop    r20             ;TO RESUME TRANSFER OF r20
        add     r20,r20,1
        prop    !r20            ;TO HALT TRANSFER OF r20
        jal     _func
_th1:
        add     r13,r20,1
        :

_func;  subu    sp, 24
        sw      r20,20(sp)
        :
        move    r20,r0
        :
        lw      r20,20(sp)
        addu    sp,24
        j       r31
```

(a)
```
        add    r20, r20, 1     ··· INSTRUCTION 1
        jal    _func           ··· INSTRUCTION 2
        add    r20, r20, 1     ··· INSTRUCTION 3
        jal    _func           ··· INSTRUCTION 4
        add    r13, r20, 1     ··· INSTRUCTION 5
           .
           .
           .
```

(b)
```
        add    r20, r20, 1     ··· INSTRUCTION 1
        jal    _func           ··· INSTRUCTION 2
        add    r20, r20, 1     ··· INSTRUCTION 3
        fork   _th1
        jal    _func           ··· INSTRUCTION 4
_th1:   add    r13, r20, 1     ··· INSTRUCTION 5
           .
           .
           .
```

(c)
```
        fork   _th1
        add    r20, r20, 1     ··· INSTRUCTION 1
        jal    _func           ··· INSTRUCTION 2
        add    r20, r20, 1     ··· INSTRUCTION 3
        jal    _func           ··· INSTRUCTION 4
_th1:   add    r13, r20, 1     ··· INSTRUCTION 5
           .
           .
           .
```

INTERPROCESSOR REGISTER SUCCESSION METHOD AND DEVICE THEREFOR

BACKGROUND OF THE INVENTION

1. Field of the Invention

The present invention relates to a parallel processor system for executing a plurality of threads which are obtained by dividing a single program in parallel to each other by a plurality of processors, and more particularly, to a method of taking a register updated in a master thread after forking over to a slave thread and a device therefor.

2. Description of the Related Art

Among methods of processing a single program in parallel by a parallel processor system is a multi-thread execution method of executing instruction streams called threads obtained by dividing a program in parallel to each other by a plurality of processors. Literatures reciting this method are, for example, Japanese Patent Laying-Open (Kokai) No. Heisei 10-27108 (hereinafter referred to as Literature 1), "Control Parallel On Chip Multiprocessor: MUSCAT" (Parallel Processing Symposium JSPP97 Articles, Japanese Society of Information Processing Engineers of Japan, pp. 229–236, May 1997) (hereinafter referred to as Literature 2), Japanese Patent Laying-Open (Kokai) No. Heisei 10-78880 (hereinafter referred to as Literature 3), "SKY: A Processor Architecture that Exploits Instruction-level Parallelism in Non-numeric Applications" (Parallel Processing Symposium JSPP98 Articles, Japanese Society of Information Processing Engineers of Japan, pp. 87–94, June 1998) (hereinafter referred to as Literature 4), and "Multiscalar Processor" (G. S. Sohi, S. E. Breach and T. N. Vijaykumar, the 22nd International Symposium on Computer Architecture, IEEE Computer Society Press, 1995, pp. 414–425) (hereinafter referred to as Literature 5). In the following, the conventional multi-thread execution methods recited in the Literatures will be described.

In general, generating a new thread on other processor in a multi-thread execution method is called "forking a thread" and a thread on the side which conducts forking operation is called a master thread, a newly generated thread is called a slave thread, a point where a thread is forked is called a fork point and a head portion of a slave thread is called a fork destination address or a start point of the slave thread. In the Literatures 1 to 4, a fork instruction is inserted at a fork point in order to give an instruction to conduct thread forking. The fork instruction has designation of a fork destination address, so that execution of the fork instruction generates a slave thread starting at the fork destination address on other processor to start execution of the slave thread. In addition, an instruction called a term instruction which terminates processing of a thread is prepared, so that each processor ends processing of a thread by the execution of the term instruction.

FIG. 12 shows outlines of processing of a multi-thread execution method. FIG. 12(a) shows a single program divided into three threads A, B and C. In a case of processing of the program by a single processor, one processor PE sequentially processes the threads A, B and C as shown in FIG. 12(b). On the other hand, as shown in FIG. 12(c), in the multi-thread execution methods recited in the Literatures 1 to 5, one processor PE1 executes the thread A and while the processor PE1 executes the thread A, the thread B is generated in other processor PE2 by a fork instruction buried in the thread A and the processor PE2 executes the thread B. The processor PE2 also generates the thread C in a processor PE3 according to a fork instruction buried in the thread B. The processors PE1 and PE2 end processing of the threads according to term instructions buried immediately before start points of the threads B and C, respectively, and when executing the last instruction of the thread C, the processor PE3 executes the subsequent instruction (system call instruction in general). By thus simultaneously executing the threads in parallel to each other by a plurality of processors, higher performance can be obtained than that of sequential processing.

As another conventional multi-thread execution method, there exists a multi-thread execution method of generating the thread B in the processor PE2 and the thread C in the processor PE3, respectively, by conducting a plurality of times of forking from the processor PE1 which executes the thread A as shown in FIG. 12(d). In contrast to the model shown in FIG. 12(d), the multi-thread execution method on which such a constraint is imposed as shown in FIG. 12(c) that a thread is allowed to generate a valid slave thread only once during its existence is referred to as one fork model. The one fork model enables thread management to be drastically simplified and realizes a thread controller as hardware on a practical hardware scale. Moreover, since an individual processor exclusively has one other processor that generates a slave thread, multi-thread execution is enabled by a parallel processor system in which adjacent processors are connected in a ring in a single direction. The present invention is premised on such one fork model.

When slave thread forking is made, register takeover from a master thread to a slave thread is necessary. The register takeover is conducted in two manners in general. One, as adopted in the parallel processor systems recited in the Literatures 1 to 3, is taking over only the contents of a register file of a master thread at the forking and not a register updated after forking, which will be referred to as register at forking transfer system hereinafter. The other, as adopted in the parallel processor systems recited in the Literatures 4 and 5, is taking over registers updated after forking as well. This will be referred to as post-forking register transfer system.

As shown in FIG. 13(a), for example, in a sequential execution program in which an instruction 1 to increment the value of a register r20 by one, an instruction 2 to call a function func, an instruction 3 to increment the value of the register r20 by one, an instruction 4 to call a function func and an instruction 5 to place the value obtained by incrementing the value of the register r20 by one at a register r13 are described in this order, when executing an instruction stream after the instruction 5 as a slave thread, a fork instruction is inserted at a time point where the value of the register r20 to which the slave thread refers is settled in the register at forking transfer system as shown in FIG. 13(b).

On the other hand, in the post-forking register transfer system, because a settled value of the register r20 is transferred to a slave thread after forking, slave thread forking can be conducted ahead without waiting for the value of the register r20 to be settled. It is accordingly possible, for example, to insert a fork instruction immediately ahead of the instruction 1 as shown in FIG. 13(c). This, however, inevitably invites a RAW (Read After Write) offense on a slave thread side, so that in the Literatures 4 and 5, a time point where a register necessary for a slave thread and its register value are settled is detected by static dependence analysis conducted by a compiler and a register transfer instruction is inserted immediately after a register to be transferred is defined or determined (Literature 4) or a register transfer bit is set in an instruction code (Literature 5), while a reception side waits for execution of an instruction until receiving the settled register value.

Although a multi-thread execution method is premised on that preceding threads whose execution is settled are basically executed in parallel, actual programs in many cases fail to obtain sufficient threads whose execution is settled. In addition, there is a possibility that desired performance could not be obtained because a parallelization rate is suppressed to be low due to limitations of dynamically determined dependence, compiler analysis capacity and the like. Literature 1 and the like therefore introduce control speculation to support speculative execution of a thread by hardware. In control speculation, a thread whose execution is highly probable is executed on speculation before the execution is settled. A thread at a speculation state is temporarily executed within a range where cancellation of the execution is possible in terms of hardware. A state where a slave thread is temporarily executed is referred to as a temporary execution state, and when a slave thread is at the temporary execution state, a master thread is regarded as being at a thread temporary generation state. In a slave thread at a temporary execution state, write to a shared memory is suppressed, while write is made to a temporary buffer provided separately. When speculation is determined to be right, a speculation success notification is issued from the master thread to the slave thread, whereby the slave thread reflects the contents of the temporary buffer in the shared memory to enter a normal state where no temporary buffer is used. In addition, the master thread enters a thread generation state out of the thread temporary generation state. On the other hand, when the speculation is determined to fail, a thread abort instruction is executed by the master thread and execution of the slave thread and the following threads is cancelled. In addition, the master thread enters a thread yet-to-be generated state out of the thread temporary generation state to again allow generation of a slave thread. In other words, in one fork mode, although thread generation is limited to one at most, when control speculation is conducted and fails, forking is again allowed. Also in this case, valid slave thread that can be generated is one at most.

In addition to those mentioned above, in the MUSCAT recited in the Literature 2, numerous dedicated instructions are prepared for flexibly controlling parallel operation of threads such as inter-thread synchronization instructions.

As described above, the post-forking register transfer system enables forking of a slave thread prior to the settlement of the value of a register necessary for the slave thread without waiting for the settlement and so much improves the degree of parallelization of instruction execution as compared to that of the register at forking transfer system. However, since a register updated in a master thread after forking is taken over to a slave thread, control should be made to prevent a RAW offense from occurring at the slave thread side. When realizing the control by the above-described methods which are recited in the Literatures 4 and 5, unnecessary synchronization occurs to degrade performance in some cases. The reason is that the methods intend to statically eliminate a RAW offense by dependence analysis at the time of compiling and to synchronize a master thread and a slave thread related to a register to be taken over to the slave thread. In the following, the problem will be described using a specific example.

Now, as shown in FIG. 14(a), assuming a sequential processing program having a block a including an update instruction of a register r10, a branch instruction b, a block c including the update instruction of the register r10, and a block d including an instruction to refer to the register r10, consideration will be given to a case of forking of the block d as a slave thread immediately before the block a. In this case, since the register r10 is referred to at the block d, the value of the register r10 should be taken over from the master thread to the slave thread. Although after a fork point, the register r10 is updated at the block a and the block c, since the block c is executed only when branch in response to the branch instruction b is realized, when the branch is realized, the value of the register r10 updated at the block c, and when the branch is not realized, the value of the register r10 updated at the block a, should be taken over to the slave thread, respectively. In such a case, according to the conventional methods recited in the Literature 5 and the like, an instruction to transfer a settled value of the register r10 to a slave thread should be inserted at a part where realization/non-realization of branch is settled as shown in FIG. 14(b). As a result, in actual program execution, an instruction to refer to the register r10 of the slave thread will be kept waiting for long irrespective of success/failure of branch in response to the branch instruction b. When branch is realized, since the value of the register r10 updated at the block c is referred to, such waiting is inevitably necessary, while when branch is not realized, since the value of the register r10 updated at the block a can be used without modification, such waiting would be unnecessary waiting for synchronization.

SUMMARY OF THE INVENTION

An object of the present invention is to provide a novel method of taking a register updated in a master thread after forking over to a slave thread and a device therefor.

Another object of the present invention is to enable, in a parallel processor system adopting a post-forking register transfer method, a RAW offense to be dynamically eliminated not at the time of compiling but at the time of program execution.

A further object of the present invention is to improve performance of a parallel processor system adopting a post-forking register transfer method by preventing unnecessary waiting for the purpose of eliminating a RAW offense from occurring.

According to one aspect of the invention, in a parallel processor system for executing a plurality of threads which are obtained by dividing a single program in parallel to each other by a plurality of processors, an interprocessor register succession method of taking a register updated in a master thread after forking over to a slave thread, comprising the steps of after forking, at every write to a general register in the master thread, transmitting an updated register value from a processor on the master thread side to a processor on the slave thread side, and executing the slave thread for speculation in the processor on the slave thread side to conduct re-execution when an offense against Read After Write (RAW) is detected.

In the preferred construction, the inter-processor register succession method comprises a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected.

In another preferred construction, the interprocessor register succession method comprises a mask bit which is operable by a special instruction to control halt and resumption of transfer to the slave thread and provided one-to-one corresponding to the general register, wherein at every write to the general register in the master thread after forking, only when the mask bit corresponding to the general register to which the write is made is at a transfer allowed state, an updated register value is transmitted from the processor on the master thread side to the processor on the slave thread side.

In another preferred construction, the interprocessor register succession method comprises a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, and a mask bit which is operable by a special instruction to control halt and resumption of transfer to the slave thread and provided one-to-one corresponding to the general register, wherein at every write to the general register in the master thread after forking, only when the mask bit corresponding to the general register to which the write is made is at a transfer allowed state, an updated register value is transmitted from the processor on the master thread side to the processor on the slave thread side.

In another preferred construction, the interprocessor register succession method comprises stack pointer preserving step of preserving a value of a stack pointer at the time of forking, and detection step of detecting coincidence between a current stack pointer value and a stack pointer value preserved in the stack pointer preserving step, wherein at every write to the general register of the master thread after forking, only when the general register to which the write is made is a function return value register and only when the general register to which the write is made is other register than the function return value register and coincidence is detected by the detection step, an updated register value is transmitted from the processor on the master thread side to the processor on the slave thread side.

In another preferred construction, the interprocessor register succession method comprises a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, stack pointer preserving step of preserving a value of a stack pointer at the time of forking, and detection step of detecting coincidence between a current stack pointer value and a stack pointer value preserved in the stack pointer preserving step, wherein at every write to the general register of the master thread after forking, only when the general register to which the write is made is a function return value register and only when the general register to which the write is made is other register than the function return value register and coincidence is detected by the detection step, an updated register value is transmitted from the processor on the master thread side to the processor on the slave thread side.

In another preferred construction, the interprocessor register succession method comprises a store address register one-to-one corresponding to each general register, wherein at the time of execution of a store instruction, a store address for each general register is stored in the store address register, at the detection of general register contents switch, transfer of the general register in question to the slave thread is inhibited and write to the store address register is halted, and an address at the time of loading is compared with the store address stored in the store address register to detect the contents of the general register being restored, thereby releasing the general register in question from the state where transfer to the slave thread is inhibited.

In another preferred construction, the interprocessor register succession method comprises a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, a store address register one-to-one corresponding to each general register, wherein at the time of execution of a store instruction, a store address for each general register is stored in the store address register, at the detection of general register contents switch, transfer of the general register in question to the slave thread is inhibited and write to the store address register is halted, and an address at the time of loading is compared with the store address stored in the store address register to detect the contents of the general register being restored, thereby releasing the general register in question from the state where transfer to the slave thread is inhibited.

In another preferred construction, only when an updated general register value differs from a value yet to be updated, the updated register value is transmitted from the processor on the master thread side to the processor on the slave thread side.

In another preferred construction, the interprocessor register succession method comprises a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, and only when an updated general register value differs from a value yet to be updated, the updated register value is transmitted from the processor on the master thread side to the processor on the slave thread side.

According to another aspect of the invention, in a parallel processor system for executing a plurality of threads which are obtained by dividing a single program in parallel to each other by a plurality of processors, an interprocessor register succession device for taking a register updated in a master thread after forking over to a slave thread, comprises means for transmitting an updated register value from a processor on the master thread side to a processor on the slave thread side at every write to a general register in the master thread after forking, and means for executing the slave thread for speculation in the processor on the slave thread side to conduct re-execution when an offense against RAW is detected.

In the preferred construction, each processor comprises a status register provided one-to-one corresponding to a general register for holding a first state at the time of thread start, holding a second state when first access to the corresponding general register after the thread start is to read, and holding a third state when first access to the corresponding general register after the thread start is to write, and means for detecting, when the status register corresponding to the general register whose register value is transmitted from the processor on the master thread side holds the second state, occurrence of an offense against RAW.

In another preferred construction, each processor comprises a mask bit which is operable by a special instruction to control halt and resumption of transfer to the slave thread and provided one-to-one corresponding to the general register, and means for transmitting an updated register value from the processor on the master thread side to the processor on the slave thread side at every write to the general register in the master thread after forking only when the mask bit corresponding to the general register to which the write is made is at a transfer allowed state.

In another preferred construction, each processor comprises a status register provided one-to-one corresponding to a general register for holding a first state at the time of thread start, holding a second state when first access to the corresponding general register after the thread start is to read, and holding a third state when first access to the corresponding general register after the thread start is to write, detection means for detecting occurrence of an offense against RAW when the status register corresponding to the general register whose register value is transmitted from the processor on the master thread side holds the second state, a mask bit which is operable by a special instruction to control halt and resumption of transfer to the slave thread and provided one-to-one corresponding to the general register, and means for transmitting an updated register value from the processor on the master thread side to the processor on the slave thread side at every write to the general register in the master thread after forking, only when the mask bit corresponding to the general register to which the write is made is at a transfer allowed state.

In another preferred construction, each processor comprises stack pointer preserving means for preserving a value of a stack pointer at the time of forking, detection means for detecting coincidence between a current stack pointer value and a stack pointer value preserved in the stack pointer preserving means, and means for transmitting an updated register value from the processor on the master thread side to the processor on the slave thread side at every write to the general register of the master thread after forking, only when the general register to which the write is made is a function return value register and only when the general register to which the write is made is other register than the function return value register and coincidence is detected by the detection means.

In another preferred construction, each processor comprises a status register provided one-to-one corresponding to a general register for holding a first state at the time of thread start, holding a second state when first access to the corresponding general register after the thread start is to read, and holding a third state when first access to the corresponding general register after the thread start is to write, detection means for detecting occurrence of an offense against RAW when the status register corresponding to the general register whose register value is transmitted from the processor on the master thread side holds the second state, stack pointer preserving means for preserving a value of a stack pointer at the time of forking, detection means for detecting coincidence between a current stack pointer value and a stack pointer value preserved in the stack pointer preserving means, and means for transmitting an updated register value from the processor on the master thread side to the processor on the slave thread side at every write to the general register of the master thread after forking, only when the general register to which the write is made is a function return value register and only when the general register to which the write is made is other register than the function return value register and coincidence is detected by the detection means.

In another preferred construction, each processor comprises a store address register one-to-one corresponding to each general register, means for storing a store address for each general register in the store address register at the time of execution of a store instruction, means for inhibiting transfer of the general register in question to the slave thread and halting write to the store address register at the detection of general register contents switch, and means for comparing an address at the time of loading with the store address stored in the store address register to detect the contents of the general register being restored, thereby releasing the general register in question from the state where transfer to the slave thread is inhibited.

In another preferred construction, each processor comprises a status register provided one-to-one corresponding to a general register for holding a first state at the time of thread start, holding a second state when first access to the corresponding general register after the thread start is to read, and holding a third state when first access to the corresponding general register after the thread start is to write, detection means for detecting occurrence of an offense against RAW when the status register corresponding to the general register whose register value is transmitted from the processor on the master thread side holds the second state, a store address register one-to-one corresponding to each general register, means for storing a store address for each general register in the store address register at the time of execution of a store instruction, means for, at the detection of contents switch of the general register, inhibiting transfer of the general register in question to the slave thread and halting write to the store address register, and means for comparing an address at the time of loading with the store address stored in the store address register to detect the contents of the general register being restored, thereby releasing the general register in question from the state where transfer to the slave thread is inhibited.

In another preferred construction, the interprocessor register succession device comprises means for detecting whether an updated value of the general register is different from a value yet to be updated, and means for transmitting an updated register value from the processor on the master thread side to the processor on the slave thread side only when the updated general register value differs from the value yet to be updated.

According to a further aspect of the invention, in a parallel processor system for executing a plurality of threads which are obtained by dividing a single program in parallel to each other by a plurality of processors, an interprocessor register succession device for taking a register updated in a master thread after forking over to a slave thread, comprises unit which transmits an updated register value from a processor on the master thread side to a processor on the slave thread side at every write to a general register in the master thread after forking, and unit which executes the slave thread for speculation in the processor on the slave thread side to conduct re-execution when an offense against RAW is detected.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIGS. 1(a), 1(b) and 1(c) are diagrams for use in explaining functions of the present invention;

FIGS. 6(a) and 6(b) are diagrams showing examples of parallelization programs obtained before and after insertion of a prop instruction;

FIG. 7 is a block diagram showing a main part of a processor according to a third embodiment of the present invention;

FIGS. 13(a), 13(b) and 13(c) are diagrams showing a program example for use in explaining two methods (register at forking transfer system and post-forking register transfer system) related to register succession;

DESCRIPTION OF THE PREFERRED EMBODIMENTS

Figure 2:
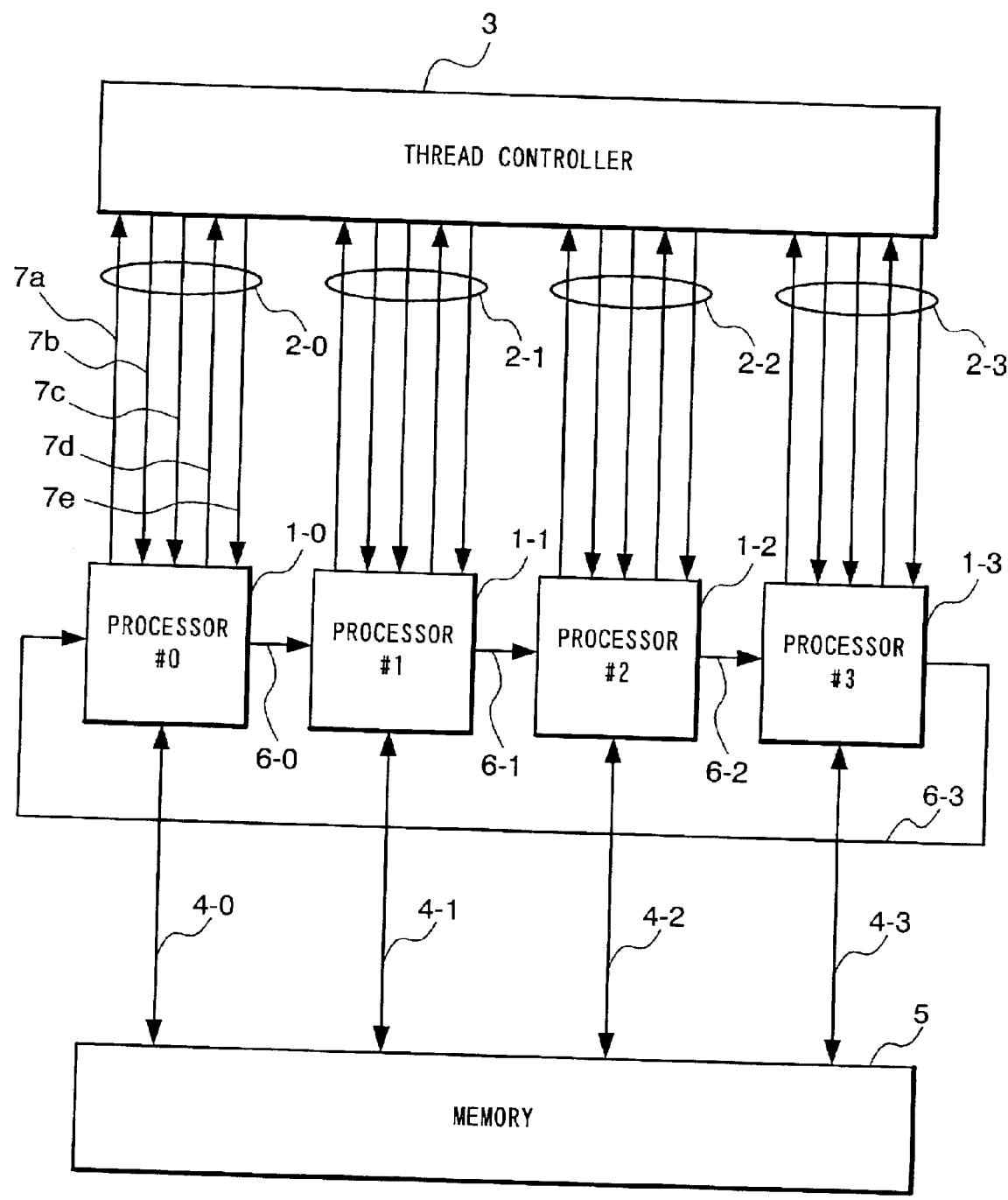
FIG. 2 is a block diagram showing one example of a parallel processor system to which the present invention is applied.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

According to a first invention, after forking, every time write is made to a general register of a master thread, the updated register value is transmitted from a processor on the master thread side to a processor on a slave thread side, and the processor on the slave thread side executes the slave thread for speculation and upon detecting a RAW offense, re-executes the same, thereby dynamically eliminating the RAW offense not at the time of compiling but at the time of program execution, as well as preventing unnecessary waiting for the purpose of eliminating a RAW offense from occurring.

The function of the first invention will be described in the following taking the sequential processing program of FIG. 14(a) used in the section of the Description of the Related Art as an example. For the forking of the block d as a slave thread immediately before the block a, the processor on the slave thread side executes the slave thread from the block d for speculation in the first invention. On the other hand, when the register r10 is updated at the block a after forking, the processor on the master thread side transfers the updated value to the slave thread side, and when the block c is executed after branch is realized in response to the branch instruction b, transfers the value of the register r10 updated at the block c to the slave thread side again. Whether the slave thread having started execution for speculation is to conduct re-execution or not due to a RAW offense is determined by success/failure of branch in the master thread in response to the branch instruction b, and timing of update and transfer of the register r10 in the master thread and timing of reference to the register r10 in the slave thread. FIG. 1 illustrates a few examples of execution sequences.

FIG. 1(a) shows a sequence used in a case where branch in response to the branch instruction b fails to be realized and a processor #1 on the slave thread side executes the instruction in the block d to refer to a register r10 after receiving the value of the register r10 updated at the block a from a processor #0 on the master thread side. In this case, no RAW offense occurs and no re-execution of the slave threads is accordingly made. FIG. 1(b) is the same as FIG. 1(a) in that branch in response to the branch instruction b is not realized and is different in that before receiving the value of the register r10 updated in the block a from the processor #0 on the master thread side, the processor #1 on the slave thread side executes the instruction in the block d to refer to the register r10 and in this case, a RAW offense occurs and re-execution of the slave thread is made. On the other hand, FIG. 1(c) illustrates an example of an execution sequence in a case where branch in response to the branch instruction b is realized, in which at the time point of receiving the value of the register r10 updated at the block c of the master thread, RAW is detected to re-execute the slave thread.

Figure 14:
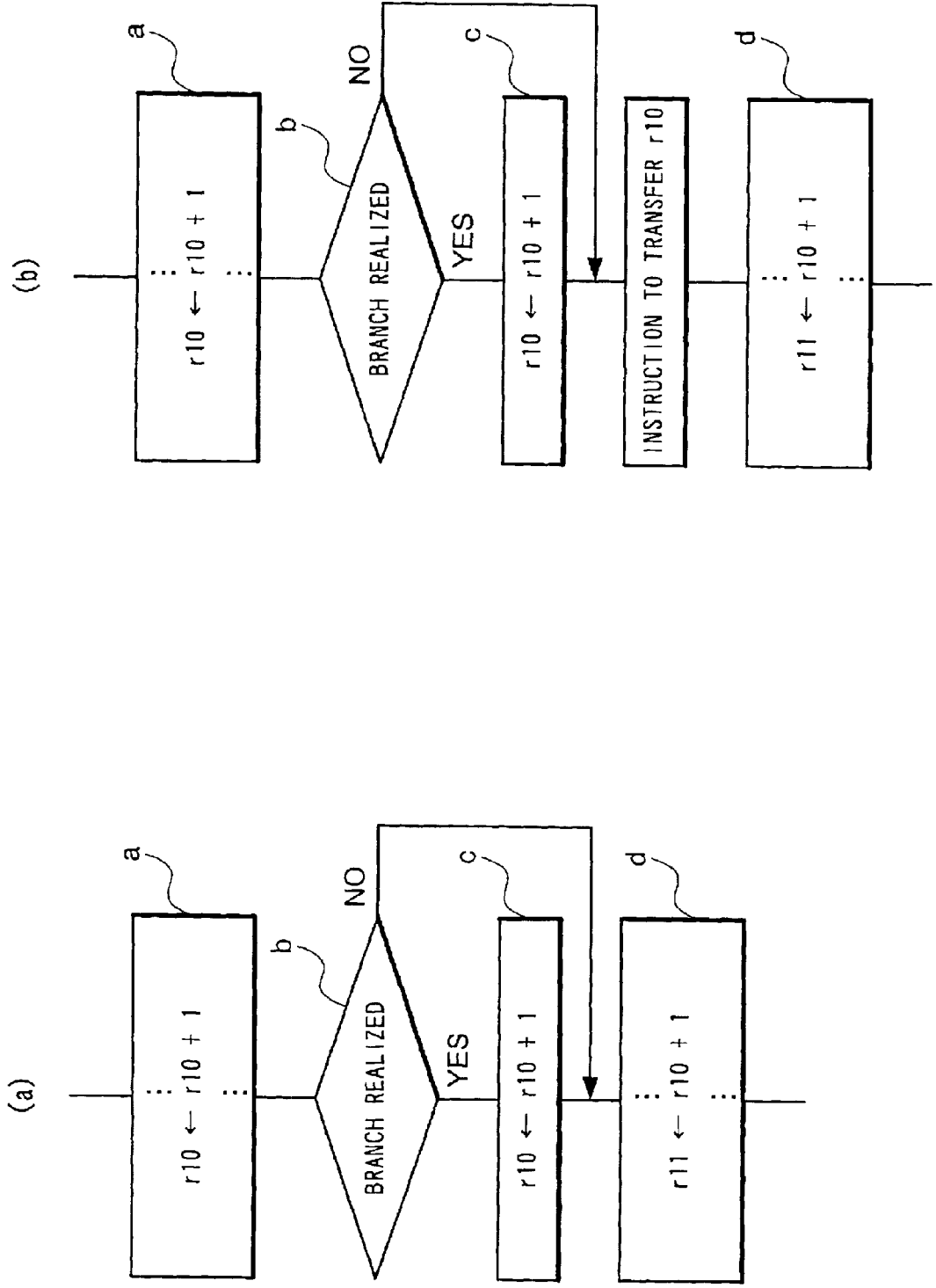
FIGS. 14(a) and 14(b) are diagrams for use in explaining conventional problems.

Comparing these execution sequences with the conventional method shown in FIG. 14(b), since an instruction to transfer the register r10 to the slave thread is inserted immediately after the block c in FIG. 14(b), the transfer timing is approximate to the transfer timing of the register r10 updated at the block c in FIG. 1(c). In the conventional method, at this timing, execution of the instruction to refer to the register r10 at the block d is first started. According to the present invention, therefore, even under the conditions that branch in response to the branch instruction b is realized, it is possible to ensure performance approximate to that in the conventional method and when branch is not realized, it is possible to drastically speed up processing of a slave thread as compared with the conventional method shown in FIGS. 1(a) and 1(b).

Also according to the first invention, when a register is updated at a master thread after forking, the value of the register is transferred to a processor on a slave thread side without fail, insertion of additional information such as a register transfer instruction which is required in conventional methods into a parallelization program is not necessary and a static dependence analysis by a compiler is not always necessary either.

On the other hand, always transferring an updated register results in degrading performance in some cases. For example, since the number of general registers is limited, when no free general register remains, operation is conducted to save a value of a general register in use in a memory and use the general register for other purpose and when finishing the use, return the register value saved in the memory to the general register in question. When this operation, which is called general register contents switching, is executed in a master thread, a register value which needs not to be transferred will be transferred in the first invention to occur useless re-execution on the slave thread side due to a RAW offense. In addition, when the register is updated to have the same value as the last one, although transfer to the slave thread is originally unnecessary, register transfer will be executed in the first invention to cause useless re-execution on the slave thread side due to a RAW offense. The second to fourth inventions avoid useless register transfer following the general register contents switching, while the fifth invention avoids useless register transfer when the register is updated to have the same value as the last one.

First Embodiment

With reference to FIG. 2, one example of a parallel processor system to which the present invention is applied is a 4-thread parallel execution type processor in which four processors 1-$i$ (i=0~3) are connected to a thread controller 3 through a signal line 2-$i$ and to a shared memory 5 through a signal line 4-$i$ as well. In addition, adjacent processors are connected in a ring through communication buses 6-0 to 6-3 in a single direction. Although in this example, a 4-thread parallel execution type processor is taken as an example, the present invention is applicable to n ($\geq 2$) thread parallel execution type processor in general such as 8-thread and 16-thread parallel execution type processors.

Each processor 1-$i$ independently has a program counter (hereinafter referred to as PC) and a register file and has a function of simultaneously fetching, interrupting and executing instructions of a thread in the memory 5 according to the PC. Each processor 1-$i$ also has a temporary buffer to enable cancel of thread execution. Each processor 1-$i$, upon transmission of a thread start request 7c having a target PC value from the thread controller 3 through the signal line 2-$i$, starts thread execution at the temporary execution state by using the temporary buffer. At this stage, the processor 1-$i$ in question is managed in the thread controller 3 as being at a busy state. The processor 1-$i$ which will end execution of a thread transmits a thread stop notice 7d to the thread controller 3 through the signal line 2-$i$. The thread stop notice 7d is accepted by the thread controller 3 on condition that the processor 1-$i$ which has given the notice executes the oldest master thread and the processor 1-$i$ in question is managed as being at a free state, so that a thread stop permission 7e is returned to the processor 1-$i$. The processor 1-$i$ releases its temporary execution state upon reception of the thread stop permission 7e to reflect the contents of the temporary buffer on the shared memory 5 and ends execution of the thread.

By a fork instruction existing in a master thread being executed, each processor 1-$i$ is allowed to conduct forking of a slave thread in one processor 1-$j(i \neq j)$ of adjacent processors (processor 1-1 for processor 1-0, processor 1-2 for processor 1-1, processor 1-3 for processor 1-2 and processor 1-0 for processor 1-3). At the forking of a slave thread, each processor 1-$i$ transmits a fork request 7a accompanied by a fork destination address (start PC value) of the slave thread to the thread controller 3 through the signal line 2-$i$. Upon receiving the fork request 7a, the thread controller 3 determines whether forking into other adjacent processor 1-$j$ is possible or not based on the state of the adjacent processor and when it is possible, transmits the thread start request 7c accompanied by a fork destination address to the processor 1-$j$ in question, as well as returning a fork response 7b to the processor 1-$i$ as a fork requesting source. The processor 1-$i$ having received the fork response 7b conducts register succession of transferring the value of the register of the master thread to the fork destination processor 1-$j$ through the communication bus 6-$i$ and the processor 1-$j$ having received the thread start request 7c starts execution of the slave thread for speculation starting at the fork destination address.

Figure 3:
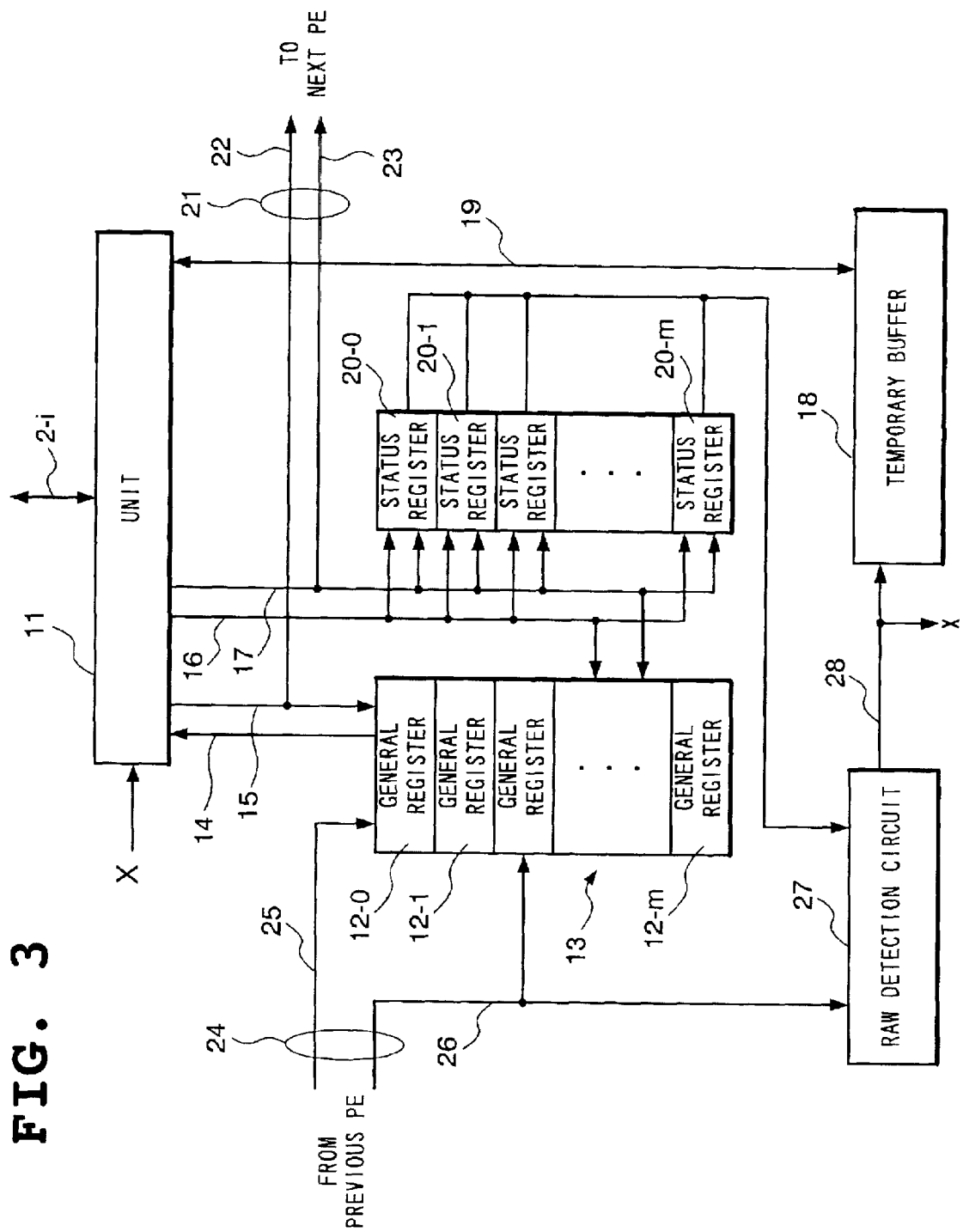
FIG. 3 is a block diagram showing a main part of a processor according to a first embodiment of the present invention.

FIG. 3 shows a block diagram of a main part of each processor 1-$i$. In FIG. 3, a control unit 11 includes a PC, an instruction fetch unit for fetching an instruction of a thread from the memory 5 according to the PC and an execution unit for decoding a fetched instruction and executing the same. A register file 13 is a set of general registers 12-0 to 12-$m$, which can be read through a register read bus 14 and a register read signal 16 and can be written through a register write bus 15 and a register write signal 17 by the unit 11. The register read bus 14 is a bus for transferring a read value, the register write bus 15 is a bus for transferring a write value, and the register read signal 16 and the register write signal 17 indicate a register number of a general register as a target of read and a register number of a general register as a target of write, respectively. In other words, at the time of access to the general register 12-$k$ (k=0~m), the unit 11 outputs the register number of the general register 12-$k$ as the register read signal 16 when in reading and outputs the register number of the general register 12-$k$ as the register write signal 17 when in writing. A temporary buffer 18 is connected to the unit 11 through a bus 19, so that the unit 11 conducts temporary execution (execution for speculation) of the thread using the temporary buffer 18.

Figure 4:
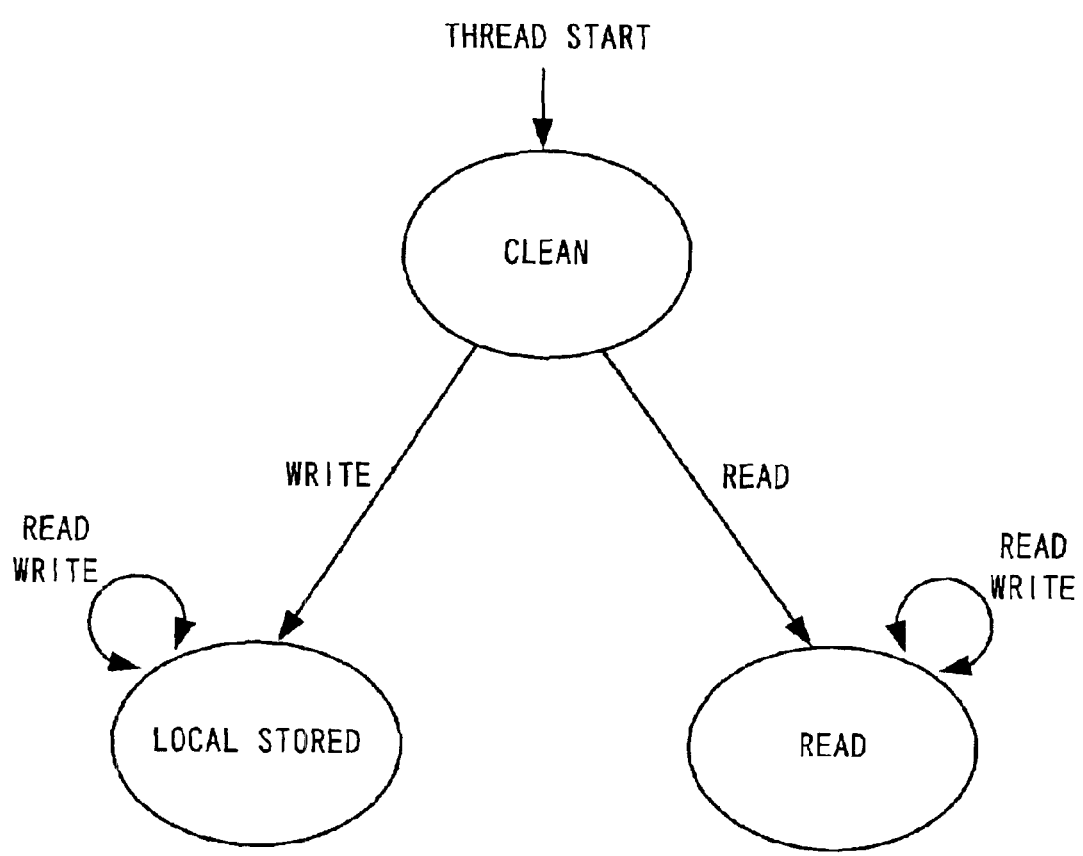
FIG. 4 is a diagram showing state transition of a status register.

A status register 20-$k$ corresponds one-to-one to the general register 12-$k$, to which the register read signal 16 and the register write signal 17 are applied. An initial state of each status register 20-$k$ is a clean state, and when the register number of the register read signal 16 indicates the general register 12-$k$ corresponding to its own register, the current state being the clean state transits to a read state and otherwise maintains the current state, and when the register number of the register write signal 17 indicates the general register 12-$k$ corresponding to its own register, the current state being the clean state transits to a local store state and otherwise maintains the current state. State transition of each status register 20-$k$ is shown in FIG. 4. Each status register 20-$k$ is at the clean state at the start of a thread in the processor in question and after the thread execution starts, when first access from the unit 11 to the corresponding general register 12-$k$ is for reading, the state transits to the read state and when the first access is for writing, it transits to the local store state indicative of a start with variable definition. In both cases, even when read and write are conducted thereafter, the read state and the local store state are maintained.

The communication bus 21 is a bus for taking a register over to a fork destination processor, which bus transfers a write value 22 output by the unit 11 onto the register write bus 15 and a register number 23 output onto the register write signal 17. A communication bus 24 is a bus for receiving register succession from a fork source processor, which bus transfers a write value 25 to a register and a register number 26. Among the general registers 12-0 to 12-$m$, a general register having the same register number as the register number 26 is rewritten with the write value 25. The communication bus 24 is equivalent to the communication bus 21 in a fork source processor. The communication buses 21 and 24 correspond to the communication buses 6-0 to 6-3 in FIG. 2.

A RAW detection circuit 27 is a detection circuit for detecting a RAW offense based on the state of the status registers 20-0 to 20-$m$ and the register number 26 output from a fork source processor to the communication bus 24. Among the status registers 20-0 to 20-$m$, when the state of a status register indicated by the register number 26 is the read state, the circuit detects a RAW offense being occurring. Upon detecting a RAW offense, the RAW detection circuit 27 outputs a cancel signal 28 to the temporary buffer 18 to cancel all the contents of the temporary buffer 18. The cancel signal 28 is also notified to the unit 11, which unit cancels a thread being executed to re-start at its start point. At this time of restart, the status registers 20-$k$ are all returned to the clean state. As well as conventional control speculation and the like, when a cancelled thread forks into a slave thread, threads following the slave thread will be cancelled.

Next, description will be made of operation of taking a register updated in a master thread after forking over to a slave thread with respect to a processor on the master thread side and a processor on the slave thread side with reference to FIG. 3.

(1) Processor on the Master Thread Side

When conducting forking of a slave thread, the unit 11, at the time of updating any of the general registers 12-$k$ through the register write bus 15 after the forking, outputs the register number 23 as the register write signal 17. The communication bus 21 transmits the write value 22 output onto the register write bus 15 and the register number 23 output onto the register write signal 17 toward a processor in which forking of the slave thread is made.

(2) Processor on the Slave Thread Side

Upon receiving the thread start request 7$c$ from the thread controller 3 through the signal line 2-$i$, the unit 11 initializes all the status registers 20-$k$ to the clean state and starting at a start point of a thread designated by the thread start request 7$c$, executes a thread for speculation related to a general register using the temporary buffer 18. When the need of access to any of the general registers 12-$k$ arises in the course of execution, in a case of read, the unit accesses the register through the register read bus 14 and outputs the number of the read general register to the register read signal 16. In a case of write, the unit accesses the register through the register write bus 15 to output the number of the written general register to the register write signal 17.

Each status register 20-$k$, when first access to its corresponding general register 12-$k$ is to read, transits to the read state and when the first access is to write, transits to the local store state. In addition, when the write value 25 and the register number 26 are transmitted from the processor on the master thread side via the communication bus 24, out of the general registers 12-0 to 12-$m$, the general register corresponding to the register number 26 is rewritten with the write value 25. When the status register 20-$k$ corresponding to the lately updated general register 12-$k$ is at the read state, the RAW detection circuit 27 detects a RAW offense to output the cancel signal 28. As a result, the temporary buffer 18 is cleared and the unit 11 cancels the thread being executed to execute the thread in question again for speculation starting at a start point of the thread. At this time, all the status registers 20-$k$ are initialized to the clean state.

When executing the thread up to the last instruction for speculation, the unit 11 transmits the thread stop notice 7$d$ to the thread controller 3 through the signal line 2-$i$ and upon receiving the thread stop permission 7$e$ from the thread controller 3, reflects the contents of the temporary buffer 18 on the memory 5 to end the execution of the thread.

Second Embodiment

The present embodiment differs from the first embodiment in that with a special instruction prepared for controlling halt and resumption of register transfer to a slave thread, at the write to a general register of a master thread after forking, only a general register at a transfer allowed state is transmitted to a processor on the slave thread side. In the following, the present embodiment will be described mainly with respect to the difference from the first embodiment.

Figure 5:
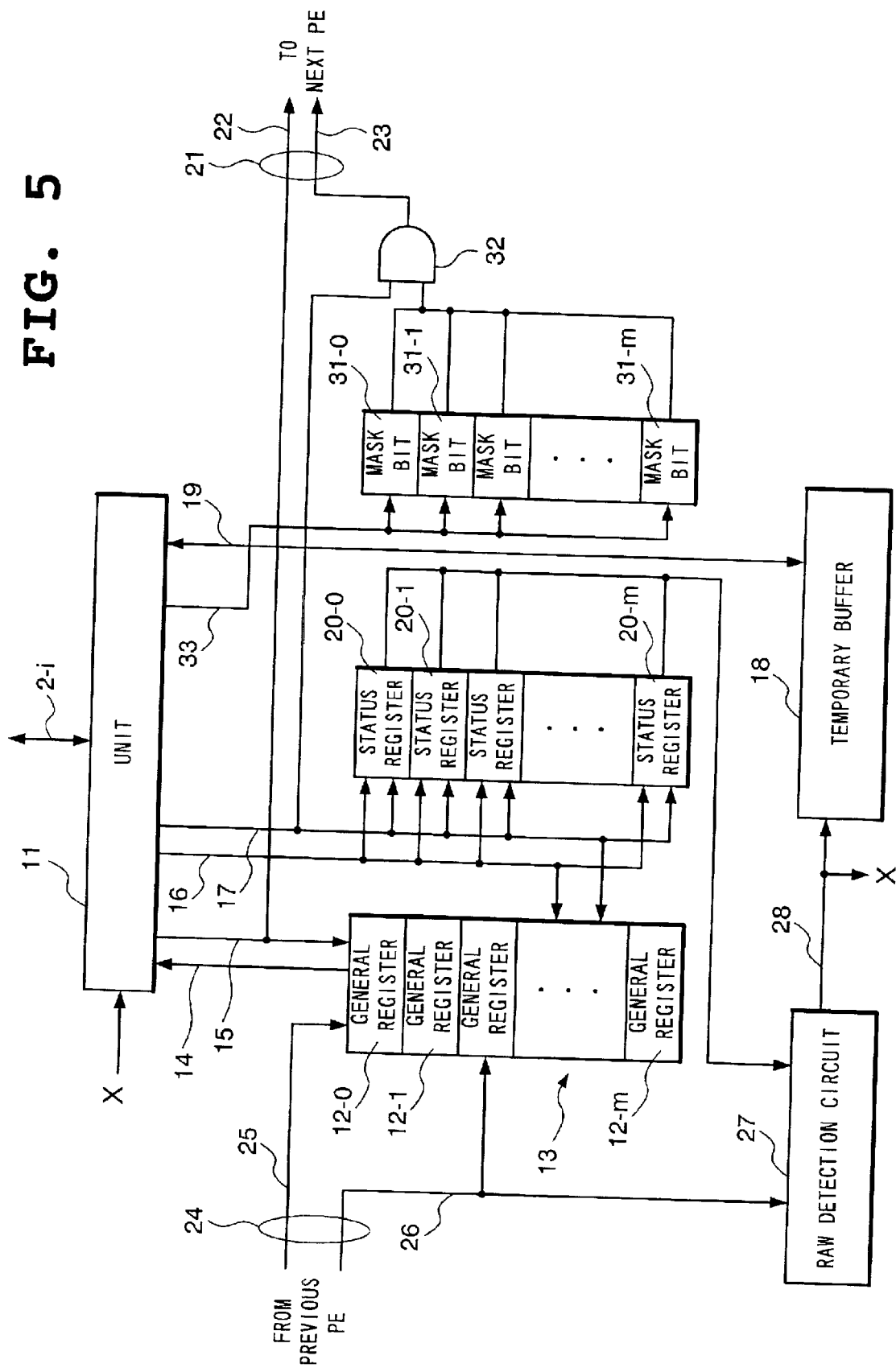
FIG. 5 is a block diagram showing a main part of a processor according to a second embodiment of the present invention.

With reference to FIG. 5, each processor 1-$i$ of the parallel processor system according to the present embodiment includes, in addition to the components shown in FIG. 3, a mask bit 31-$k$ corresponding one-to-one to the general register 12-$k$ and a gate circuit 32 for outputting the register number 23 of a general register which is lately written onto the communication bus 21 only when the mask bit 31-$k$ corresponding to the general register 12-$k$ of the register number 23 indicated by the register write signal 17 is at the transfer allowed state. The mask bit 31-$k$ is at the transfer allowed state (e.g. "1") at the time of start of a thread, which mask bit is updated to a transfer inhibited state (e.g. "0") by a control signal output onto an update bus 33 in response to a special instruction executed in the unit 11 or returned to the transfer allowed state again.

The above-described special instruction will be referred to as a propagate instruction (prop instruction as abbreviation) in the present embodiment. The prop instruction has two kinds, one for transfer halt and the other for transfer resumption, which are inserted into the parallelization program in the following manner.

| | |
|---|---|
| prop !r20 | (a) |
| prop r20 | (b) |

The prop instruction a is an instruction to halt transfer of the register r20 to a slave thread after the instruction. The prop instruction b is an instruction to resume transfer of the register r20 to a slave thread after the instruction.

FIG. 6(a) shows an example of a parallelization program as of before the insertion of a prop instruction. In this program, contents switch is made of the register r20 within a function func. Although write to the register r20 within the function func is not true dependence, since in the first embodiment, the value of the register r20 is transferred to the slave thread side at the time of update of the register r20 following the contents switching, detection of a RAW offense causes re-execution.

FIG. 6(b) shows an example of a parallelization program into which a prop instruction is inserted. Halting and resuming transfer of the register r20 by a prop instruction before and after call of the function func prevents useless transfer and re-execution upon detection of a RAW offense.

Next, operation of the present embodiment will be described taking the program shown in FIG. 6(b) as an example. Since operation of a processor on the slave thread side is the same as that of the first embodiment, description will be made only of operation of a processor on the master thread side.

The unit 11 conducts forking of a slave thread in response to a fork instruction "fork th1". When the unit 11 executes the subsequent instruction "add r20, r20, 1" including update of the register r20, since the mask bit 31-k corresponding to the register r20 is at the initial state of the transfer allowed state, the updated value of the register r20 will be transmitted to the processor on the slave thread side through the communication bus 21 together with the register number. Because the subsequent instruction is the prop instruction a, the mask bit 31-k corresponding to the register r20 is set at the transfer inhibited state. Accordingly, even through the function func is called to execute, within the function, instructions "move r20, r0", "lw r20, 20(sp)" and the like including update of the register r20 at the unit 11, no transfer of the register r20 is conducted. Since the instruction immediately after the instruction to call function func is the prop instruction b, the mask bit 31-k corresponding to the register r20 is returned to the transfer allowed state. Accordingly, when the unit 11 subsequently executes the instruction "add r20, r20, 1" including update of the register r20, the updated value of the register r20 is transferred to the processor on the slave thread side. In the program of FIG. 6(b) hereafter, the prop instruction a again inhibits transfer of the register r20 before calling the subsequent function func.

Third Embodiment

The present embodiment is different from the first embodiment in that noticing a point that almost all the general register contents switches are derived from function call, a processor on a master thread side preserves a value of a stack pointer (SP) at forking and when the general register is updated after forking, excepting a case where the updated general register is a function return value register, transfers the updated general register value to a processor on a slave thread side only when the current stack pointer value is equal to the preserved stack pointer value. In the following, the present embodiment will be described mainly with respect to the difference from the first embodiment.

Figure 7:
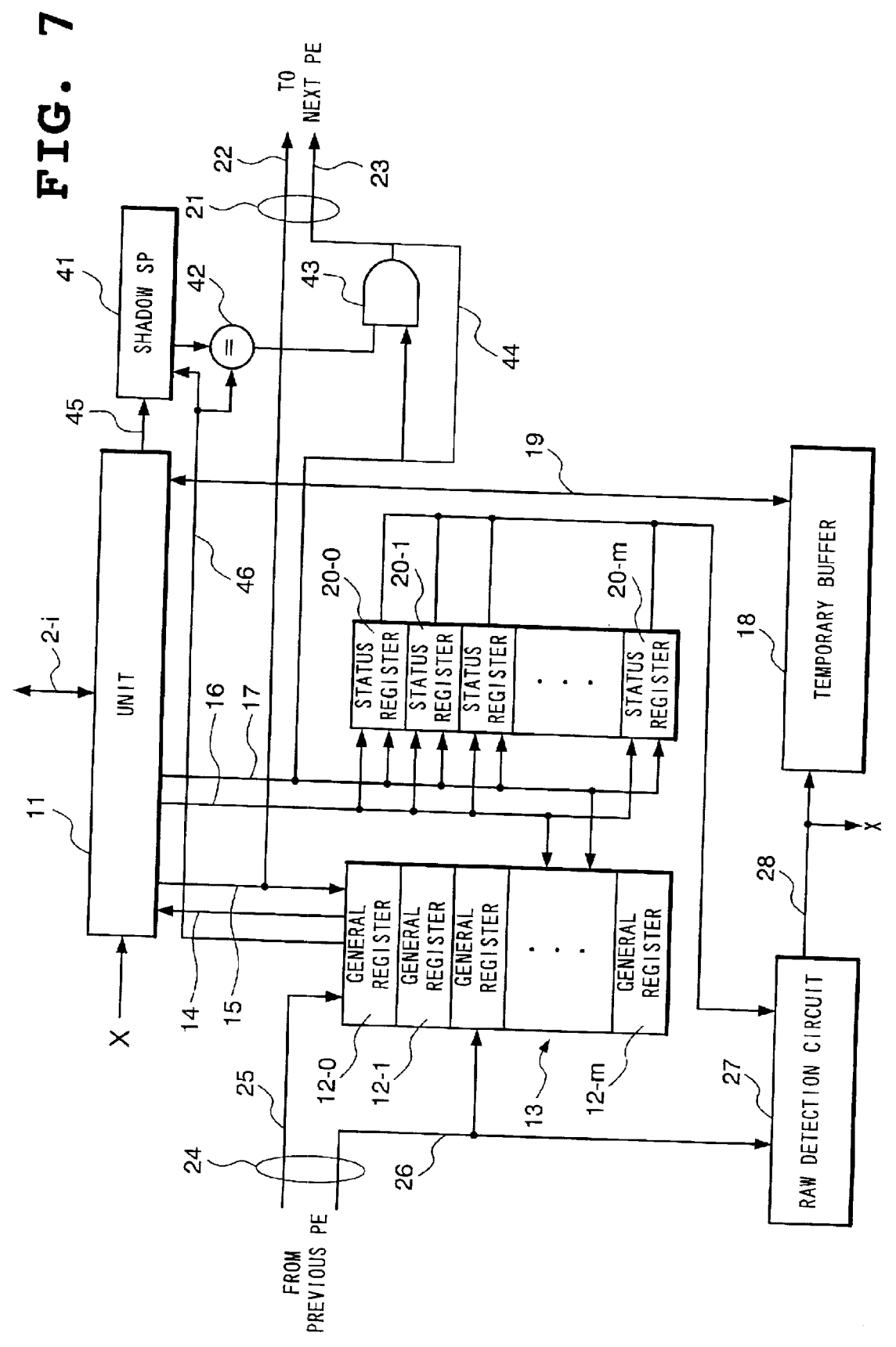

With reference to FIG. 7, each processor 1-i of the parallel processor system according to the present embodiment includes, in addition to the components shown in FIG. 3, a shadow stack pointer 41 for preserving a value of the stack pointer (SP) at the forking, a comparison circuit 42 for detecting coincidence between the current value of the stack pointer (SP) and the value of the shadow stack pointer 41, a gate circuit 43 for outputting the register number 23 indicated by the register write signal 17 onto the communication bus 21 only when the comparison circuit 42 detects the coincidence, and a write signal 44 for return value register for outputting, when a general register to which write is made is a function return value register, the register number 23 of the return value register in question onto the communication bus 21 irrespective of coincidence or non-coincidence detected by the comparison circuit 42.

Next, operation of the present embodiment will be described. Since operation of a slave thread side processor is the same as that in the first embodiment, description will be made only of operation of a master thread side processor.

When conducting forking of a slave thread, the unit 11 outputs a fork signal 45 to the shadow stack pointer 41 to preserve the value of the stack pointer (SP), which pointer is one of the general registers in the register file 13, in the shadow stack pointer 41 via a signal line 46. Thereafter, the value of the stack pointer preserved in the shadow stack pointer 41 is compared at the comparison circuit 42 with the value of the stack pointer (SP) read through the signal line 46 and a signal indicative of coincidence/non-coincidence is output to the gate circuit 43.

After the forking of a slave thread, every time update is made of any of the general registers 12-k through the register write bus 15, the unit 11 outputs the register number in question as the register write signal 17. When the general register to which the write is made is a function return value register, the unit outputs the number of the return value register onto the write signal line 44 for return value register. The function return value register is determined in advance by architecture, compiler and the like of the computer. Also when the general register to which write is made is a function return value register, the register number 23 on the write signal line 44 for return value register and the write value 22 on the register write bus 15 are transferred to the slave thread side processor through the communication bus 22. On the other hand, when the general register to which the write is made is other register than a function return value register, as long as the current stack pointer (SP) value and the stack pointer value preserved in the shadow stack pointer 41 coincide with each other in the comparison circuit 42, the register number 23 of the register write signal 17 is passed through the gate circuit 43 and together with the write value 22, transferred to the slave thread side processor through the communication bus 22.

In a case, for example, of the program shown in FIG. 6(a), the value of the stack pointer (SP) obtained at the forking of a slave thread in response to a fork instruction "fork th1" is preserved in the shadow stack pointer 41 through the signal line 46 and at the time of the subsequent instruction "add r20, r20, 1" including update of the register r20, since the current value of the stack pointer (SP) is coincident with the value preserved in the shadow stack pointer 41, the updated value of the register r20 is transmitted to the slave thread side processor through the communication bus 21 together with the register number. When the function func is called by the subsequent function call instruction to update the stack pointer (SP), the updated value will differ from the value preserved in the shadow stack pointer 41, so that even when instructions "move r20, r0", "lw r20, 20(sp)" and the like including update of the register r20 are executed at the unit 11, no transfer of the register r20 will be conducted. Thereafter, when the stack pointer (SP) is returned to have the original value to end the processing of the function func, the value of the stack pointer (SP) goes equal to the value of the shadow stack pointer 41, so that when the unit 11 subsequently executes the instruction "add r20, r20, 1" including update of the register r20, the updated value of the register r20 will be transferred to the slave thread side processor.

Fourth Embodiment

The present embodiment differs from the first embodiment in that noticing the facts that general register contents switches are in many cases accompanied by store and load in a memory (stack region in particular) and that occurrence of contents switch can be determined without additional information by detecting "an instruction to write data to a register in question without referring to the register in question", with a store address register provided one-to-one corresponding to each general register, storing a store address for each general register in the corresponding store address register at the time of execution of a store instruction to inhibit transfer of the general register in question to a slave thread upon detection of contents switch of the general register, as well as halting write to the store address register and on the other hand, comparing an address at the time of loading with a store address stored in the store address register to determine whether the contents of the general register are restored and release the state where transfer to the slave thread is inhibited. In the following, the present embodiment will be described mainly with respect to the difference from the first embodiment.

Figure 8:
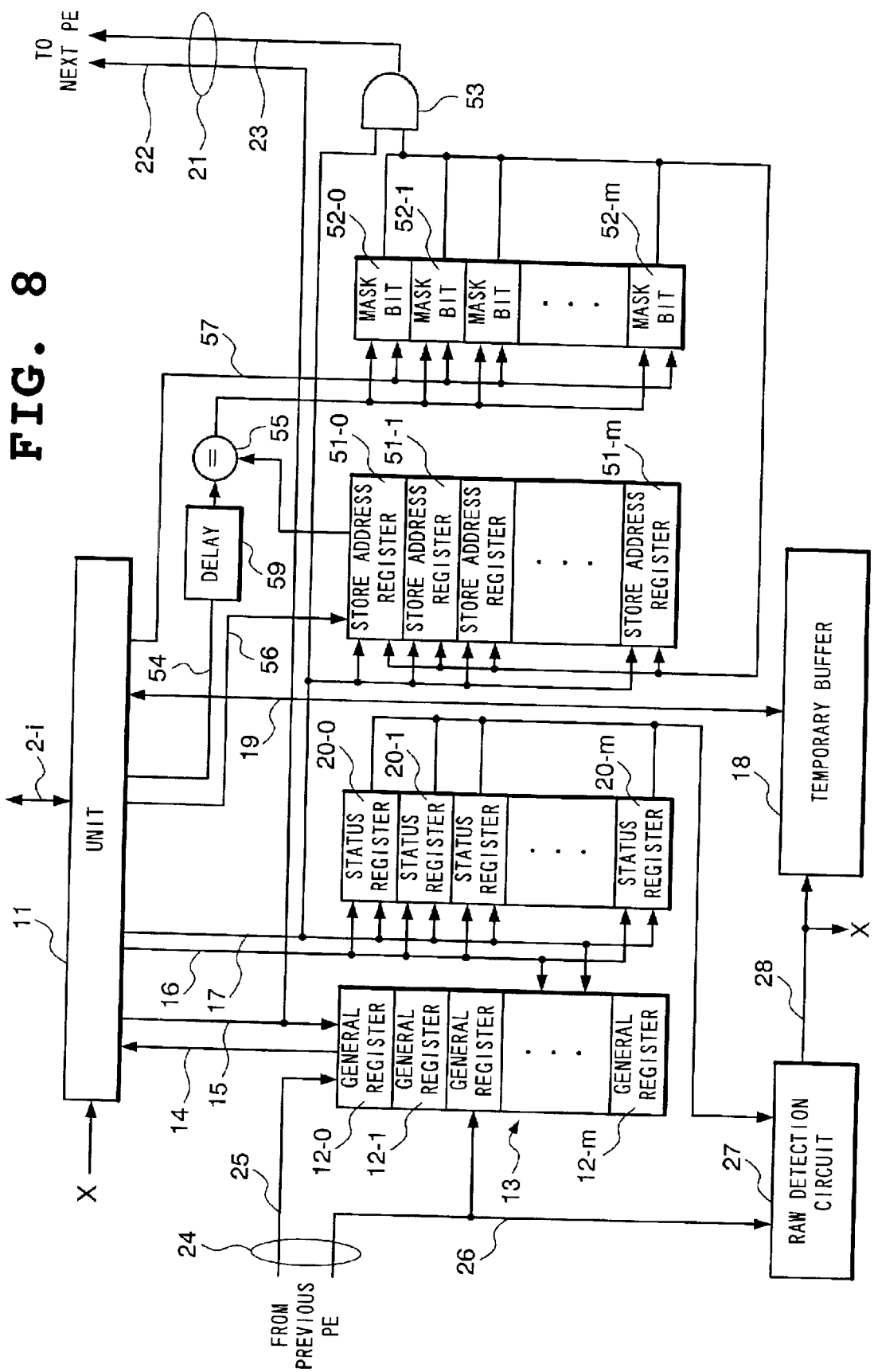
FIG. 8 is a block diagram showing a main part of a processor according to a fourth embodiment of the present invention.

With reference to FIG. 8, each processor 1-*i* of the parallel processor system according to the present embodiment includes, in addition to the components shown in FIG. 3, a store address register 51-*k* and a mask bit 52-*k* one-to-one corresponding to the general register 12-*k*, a gate circuit 53 for outputting, only when the mask bit 52-*k* corresponding to the general register 12-*k* having the register number 23 indicated by the register write signal 17 is at the transfer allowed state (e.g. "1"), the lately updated register number 23 onto the communication bus 21, and a comparison circuit 55 for detecting whether a store address coincident with a load address output from the unit 11 through a signal line 54 and a delay 59 for timing adjustment is recorded in the store address register 51-*k* or not.

To each store address register 51-*k*, the register number 23 indicated by the register write signal 17 and the store address output from the unit 11 through a signal line 56 are applied and in the store address register 51-*k* corresponding to the register number 23, the store address on the signal line 56 is recorded. Exceptionally, when the corresponding mask bit 52-*k* is set at the transfer inhibited state (e.g. "0"), no recording of a store address will be newly conducted. The store address recorded in each store address register 51-*k* can be referred to by the comparison circuit 55 through a reference bus 58.

Each mask bit 52-*k* can be set at the transfer allowed state and the transfer inhibited state through an update bus 57 by the unit 11 and can be set at the transfer allowed state by the output of the comparison circuit 55. The output of each mask bit 52-*k* is output to the gate circuit 53 and to the corresponding store address register 51-*k*.

Next, operation of the present embodiment will be described. Since operation of the slave thread side processor is the same as that of the first embodiment, description will be made only of operation of the master thread side processor.

At the time of forking of a slave thread, the unit 11 initially sets all the mask bits 52-*k* at the transfer allowed state through the update bus 57. Thereafter, at the execution of a store instruction including read of the general register 12-*k*, the unit outputs the register number of the general register 12-*k* to the register read signal 16, as well as outputting its store address onto the signal line 56 to record the store address in the store address register 51-*k* corresponding to the general register 12-*k*. In addition, at the execution of such an instruction as a move instruction to write data to the general register 12-*k* without referring to a value of the register, determining that contents switch of the general register 12-*k* occurs, the unit sets the mask bit 52-*k* corresponding to the general register 12-*k* at the transfer inhibited state through the update bus 57. Accordingly, even when the general register 12-*k* is updated, the updated value will not be transferred to the slave thread.

Thereafter, when a load instruction is executed at the unit 11 in order to return the contents of the general register 12-*k* to the original value, its load address is output from the unit 11 by the delay 59 to the comparison circuit 55 with a delay of, for example, one instruction cycle. The comparison circuit 55 determines whether a store address coincident with the output load address is recorded in the store address register 51-*k* or not and when it is recorded, changes the mask bit 52-*k* from the transfer inhibited state to the transfer allowed state. As a result, the general register 12-*k* is updated and the updated value will be transferred to the slave thread again.

In a case of the program shown in FIG. 6(*a*), for example, at the time of fork of a slave thread in response to the fork request "fork th1", all the mask bits 52-*k* are set at the transfer allowed state. Accordingly, at the time of the subsequent instruction "add r20, r20, 1" including update of the register r20, the updated value of the register r20 is transmitted to the slave thread side processor through the communication bus 21 together with the register number. When the function func is called by the subsequent function call instruction to execute a store instruction "Sw r20, 20(sp)", the store address is recorded in the store address register 51-*k* corresponding to the register r20. Then, at the execution of the move instruction "r20, r0", the unit 11 detects the contents switch of the register r20 occurring to change the mask bit 52-*k* corresponding to the register r20 to the transfer inhibited state. Therefore, the updated value of the register r20 will not be transferred to the slave thread. This is also the case with the subsequent load instruction "lw r20, 20(sp)". Then, coincidence of the load address output from the unit 11 to the signal line 54 at the execution of the load instruction with the store address recorded in the store address register 51-*k* corresponding to the register r20 is detected by the comparison circuit 55, so that the mask bit 52-*k* corresponding to the register r20 is returned to the transfer allowed state. Accordingly, when the processing of the function func is completed and the unit 11 subsequently executes the instruction "add r20, r20, 1" including update of the register r20, the updated value of the register r20 will be transferred to the slave thread side processor.

Fifth Embodiment

In the first to fourth embodiments, irrespective of whether an updated value of a general register differs from that yet to be updated or not, the updated register value is transmitted from the master thread side processor to the slave thread side processor. A write value to the general register which is the same as a preceding value, however, needs not to be transmitted. In the present embodiment, at the time of write to the general register, by comparing the write value with a value as of before the writing, the volume of useless register transmission is reduced to prevent useless re-execution on the slave thread side due to detection of a RAW offense. In the following, the present embodiment will be described mainly with respect to the difference from the first embodiment.

Figure 9:
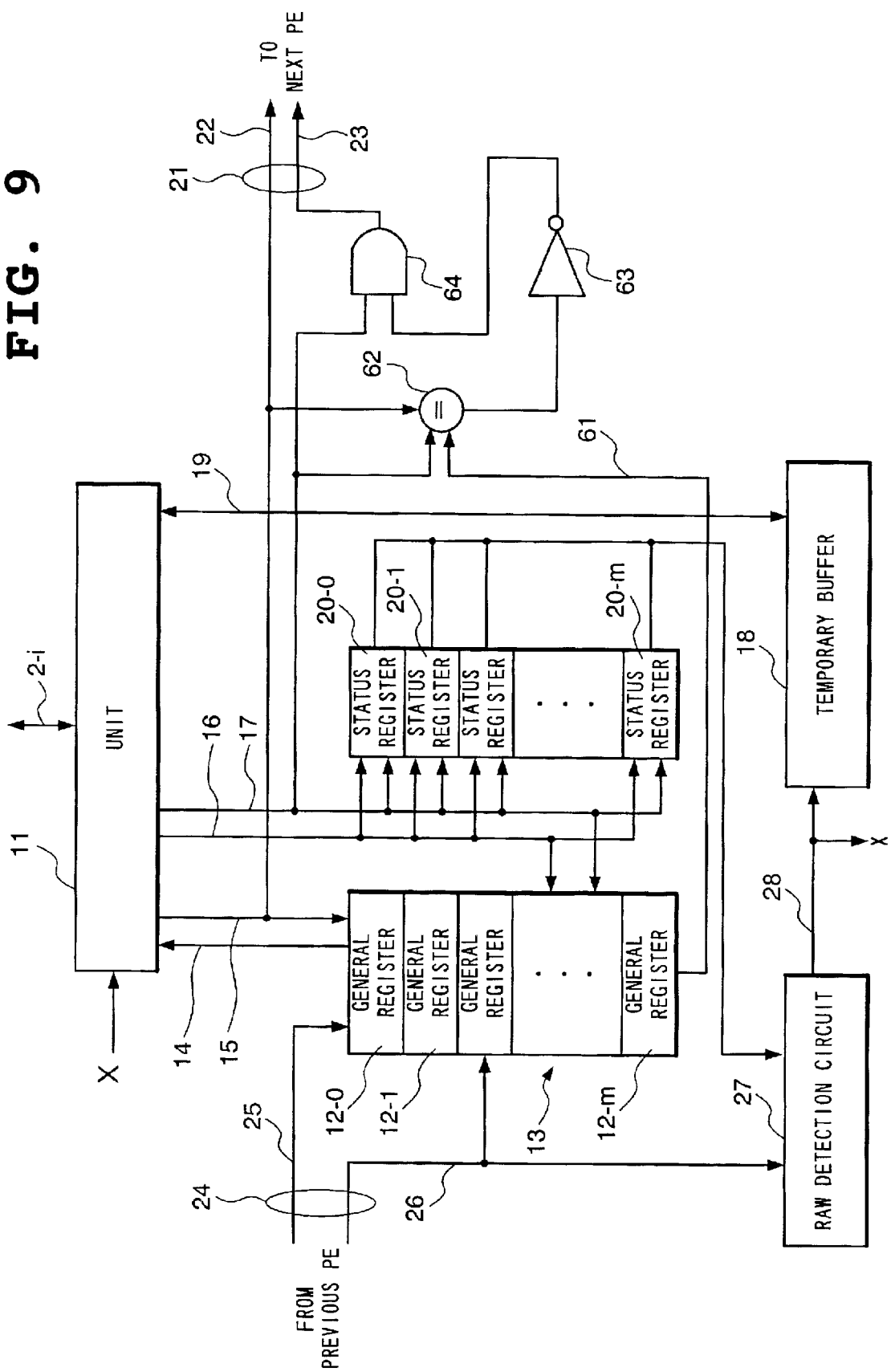
FIG. 9 is a block diagram showing a main part of a processor according to a fifth embodiment of the present invention.

With reference to FIG. 9, each processor 1-$i$ of the parallel processor system according to the present embodiment includes, in addition to the components shown in FIG. 3, a comparison circuit 62 for referring, through a register read bus 61, to the contents as of before write of the general register 12-$k$ having the register number 23 output by the unit 11 onto the register write signal 17 among the general registers 120 to 12-$m$ and detecting coincidence between the register value as of before the write and the write value 22 output to the register write bus 15, an inverter 63 for inverting the output of the comparison circuit 62, and a gate circuit 64 for receiving input of the output of the inverter 63 and the register number 23 output onto the register write signal 17 and only when coincidence between register values as of before and after write is detected by the comparison circuit 62, outputting the register number 23 to the communication bus 21.

Next, operation of the present embodiment will be described. Since operation of the slave thread side processor is the same as that of the first embodiment, description will be made only of operation of the master thread side processor.

After conducting forking of a slave thread, at the time of updating any of the general registers 12-$k$ through the register write bus 15 after the forking, the unit 11 outputs the relevant register number 23 as the register write signal 17. The comparison circuit 62 reads, according to the register number 23 of the register write signal 17, a register value as of before the write of the general register 12-$k$ having the same register number, compares the value with the write value 22 output by the unit 11 onto the register write bus 15 and when they are coincident, sets its output at "0" to open the gate circuit 64 through the inverter 63. When they fail to coincide with each other, the output of the comparison circuit 62 remains "1" and the gate circuit 64 is closed. Accordingly, exclusively when the write value 22 of the general register 12-$k$ is the same as that obtained before update, the communication bus 21 transmits the write value 22 and the register number 23 toward a fork destination processor.

Although the foregoing has been applied to the first embodiment, the second to fourth embodiments can be also structured such that only when register values as of before and after update are coincident with each other, the register value is transferred to a fork destination processor.

In each of the foregoing embodiments, no recitation is made of a method of succession of a register which is not updated in a master thread after forking but necessary on a slave thread side. As to succession of such registers, the present invention may employ a method of transferring all the contents of the register file of the master register at the time of forking to the slave thread in the lump as recited in the Literatures 1 to 3 or a method of transferring a value of at least a register necessary for the slave thread in the register file of the master register at a fork point if the register necessary for the slave thread is already found by static analysis by a compiler. Moreover, an arbitrary method can be adopted such as a method of sequentially transferring the contents of the register file of the master thread at a fork point on a register basis, while re-transferring a register once transferred when it is updated in the master thread. The present invention is allowed to adopt arbitrary methods as a method of taking over a register which is not updated in a master thread after forking but is necessary on a slave thread side, some embodiments of which will be described in the following.

Sixth Embodiment

Figure 10:
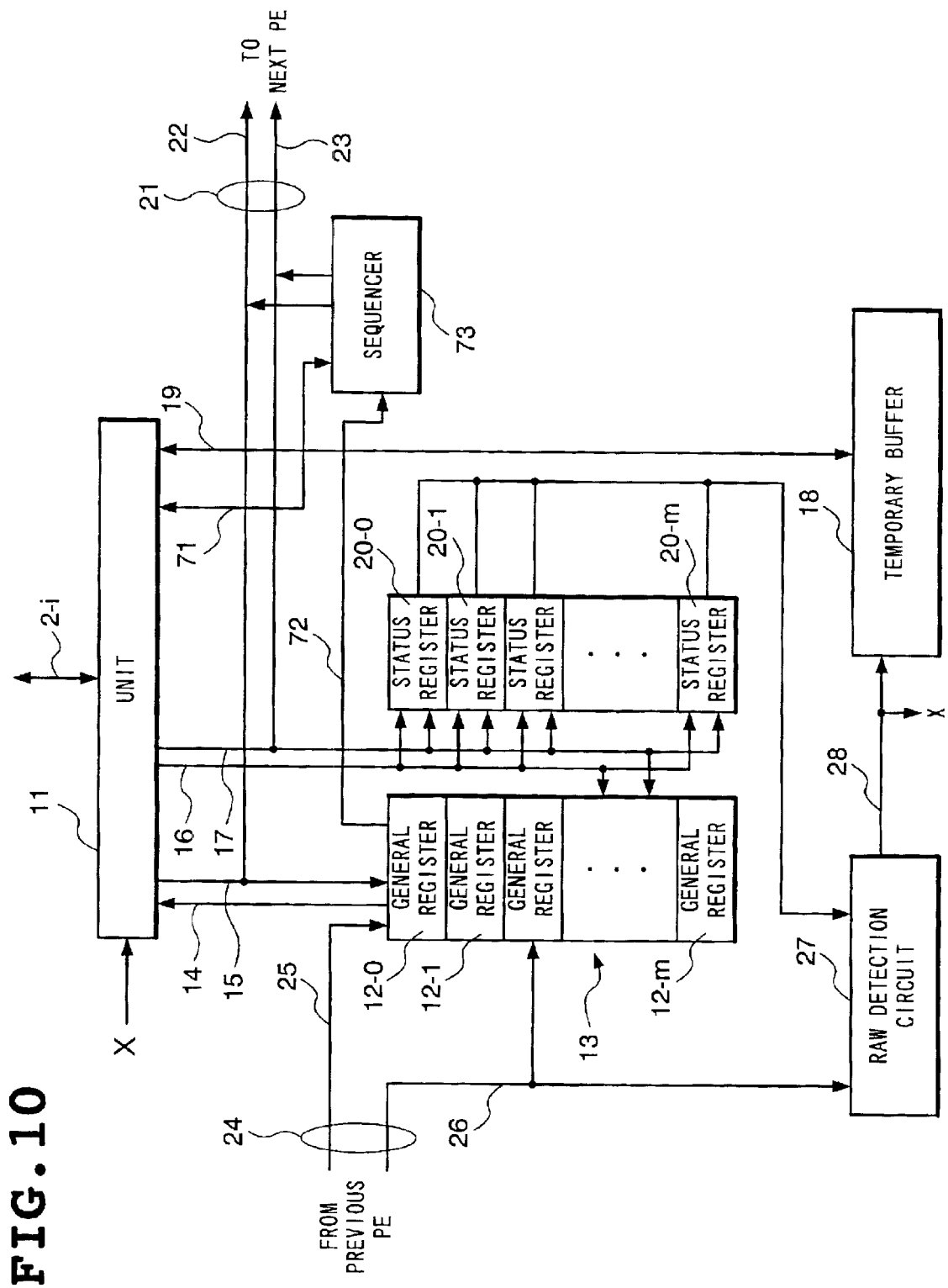
FIG. 10 is a block diagram showing a main part of a processor according to a sixth embodiment of the present invention.

With reference to FIG. 10, each processor 1-$i$ of the parallel processor system according to the present embodiment includes, in addition to the components shown in FIG. 3, a sequencer 73 for receiving a notice that forking of a slave thread is made from the unit 11 through a signal line 71 to sequentially read the contents of the general registers 12-0 to 12-$m$ through a reference bus 72, outputting a write value and a register number of the read register onto the communication bus 21 and notifying the unit 11 to that effect through the signal line 71 when transfer of all the general registers 12-0 to 12-$m$ is completed. When notified of transfer end by the sequencer 73, the unit 11 starts execution of an instruction subsequent to the fork instruction. When a register to be taken over to a slave thread is already found by static analysis by a compiler, by notifying the sequencer 73 of the information through the signal line 71, only the contents of a register to be taken over to the slave thread can be transferred.

While in the present embodiment, the sequencer 73 transfers register contents through the communication bus 21 for taking a register updated in the master thread after forking to the slave thread, the sequencer may be structured to transfer the contents of all the general registers 12-0 to 12-$m$ in the lump using another communication bus having a large capacity. In addition, although the present embodiment is applied to the first embodiment, it is applicable also to the second to fifth embodiments in the same manner.

Seventh Embodiment

Figure 11:
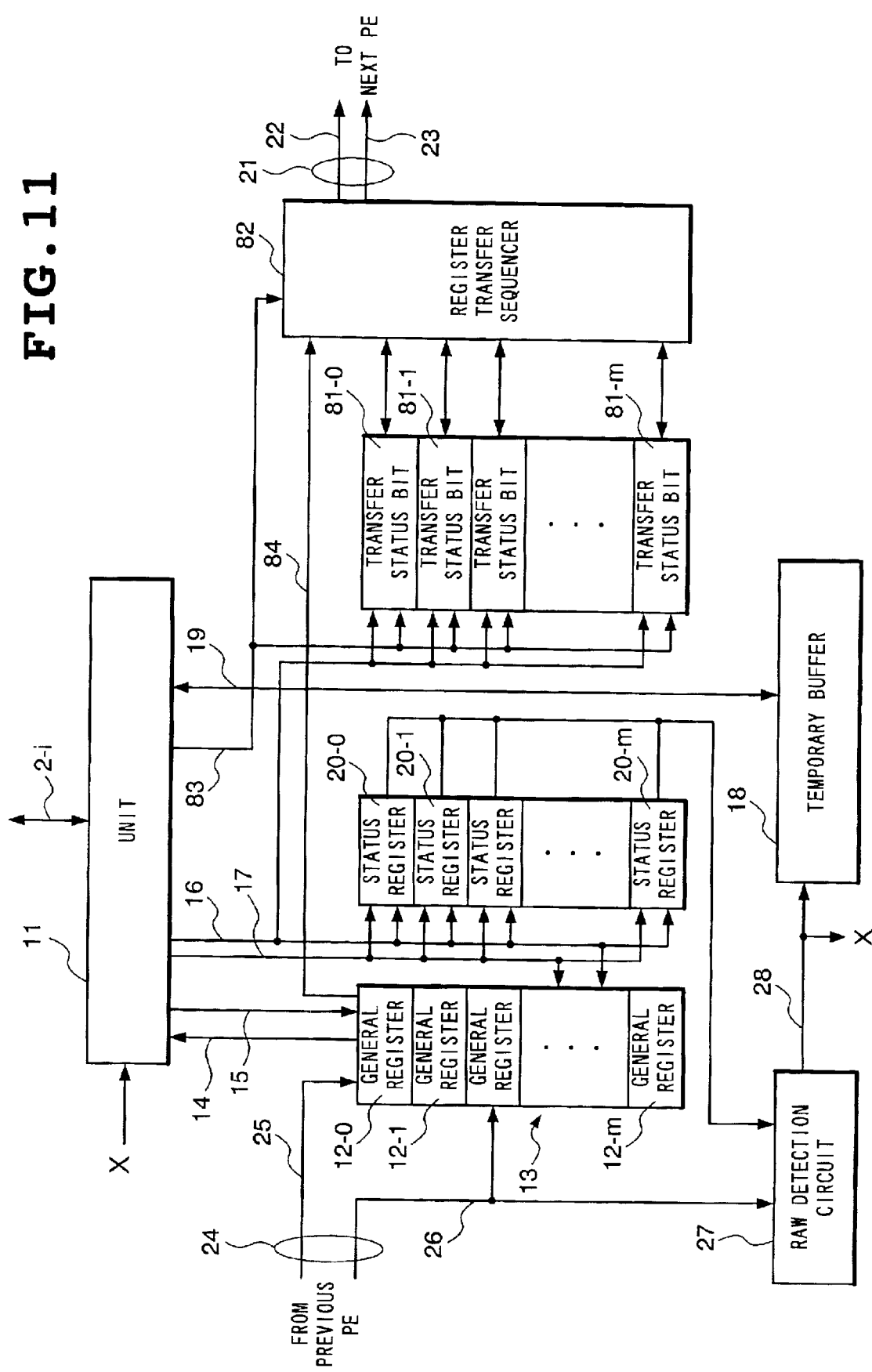
FIG. 11 is a block diagram showing a main part of a processor according to a seventh embodiment of the present invention.
Figure 12:
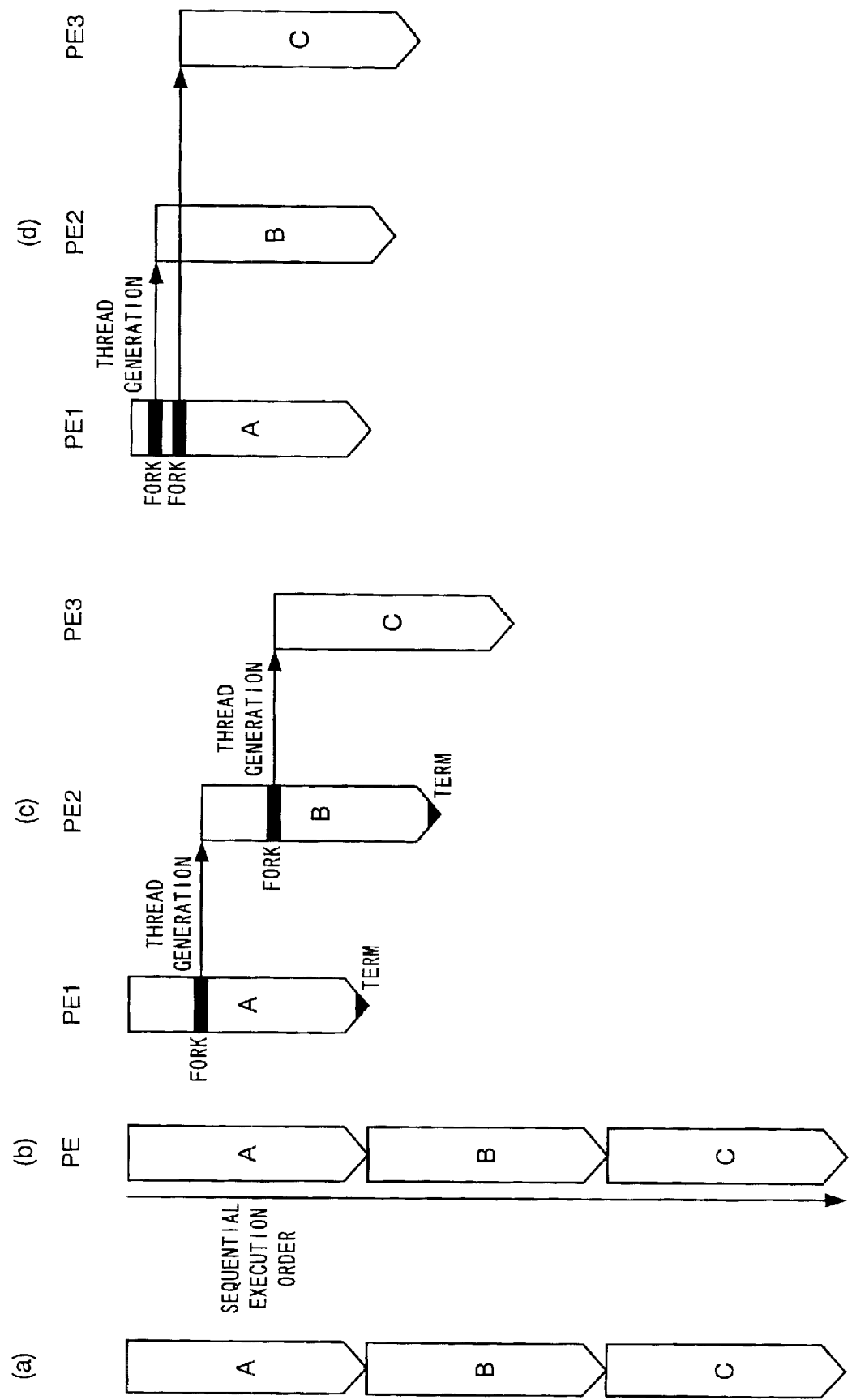
FIGS. 12(a), 12(b), 12(c) and 12(d) are diagrams showing outlines of processing of a conventional multi-thread execution method.

With reference to FIG. 11, each processor 1-$i$ of the parallel processor system according to the present embodiment includes, in addition to the components shown in FIG. 3, a transfer status bit 81-$k$ one-to-one corresponding to each general register 12-$k$ and a register transfer sequencer 82.

All the transfer status bits 81-$k$ are initially set at a yet-to-be transferred state (e.g. "1") at a time point where a notice that forking of a slave thread is made is output from the unit 11 onto a signal line 83 and set at a transferred state (e.g. "0") at a time point where transfer to a fork destination processor is conducted by the register transfer sequencer 82. After the transfer, however, when the unit 11 updates the general register 12-$k$, the transfer status bit 81-$k$ corresponding to the updated general register 12-$k$ is again set at the yet-to-be transferred state based on the register number on the register write signal 17.

Upon receiving a notice that forking of a slave thread is conducted from the unit 11 through the signal line 83, the register transfer sequencer 82 sequentially reads the contents of the general registers 12-0 to 12-$m$ through a reference bus 84 and outputs the write value 22 and the register number 23 of the register onto the communication bus 21 to change the transfer status bit 81-$k$ corresponding to the output general register 12-$k$ to the transferred state. When completing all the transfer of the general registers 12-0 to 12-$m$, the register transfer sequencer 82 monitors all the time whether any of the transfer status bits 81-0 to 81-$m$ is at the yet-to-be transferred state or not and every time it detects the transfer status bit 81-$k$ at the yet-to-be transferred state, reads the contents of the relevant general register 12-$k$ through the reference bus 84 and outputs the write value 22 and the register number 23 of the register onto the communication bus 21 to change the transfer status bit 81-*k* corresponding to the output general register 12-*k* to the transferred state. In the present embodiment, immediately after forking, the unit 11 starts execution of an instruction following the fork instruction.

Although the present invention has been described with respect to several embodiments in the foregoing, it is not limited to the foregoing embodiments and various kinds of addition and modification are possible. For example, while in each of the above-described embodiments, the present invention is applied to a centralized thread control type parallel processor system in which the thread controller 3 is provided commonly for a plurality of processors, it is also applicable to a distributed thread control type parallel processor system in which a thread controller is provided for each processor as recited in the Literature 1 and the like. In addition, although in the above-described embodiments, register transfer is conducted using a communication bus which connects adjacent processors in a ring in a single direction, in a parallel processor system in which all the processors are connected to a common communication bus, register transfer is conducted using the common communication bus.

As described in the foregoing, according to the present invention, by transmitting an updated register value at every write of a general register after forking from a master thread side processor to a slave thread side processor, executing the slave thread for speculation by the slave thread side processor and conducting re-execution upon detection of a RAW offense, the RAW offense can be dynamically eliminated not at the time of compiling but at the program execution and unnecessary waiting for the purpose of eliminating a RAW offense can be avoided.

Moreover, the second to fourth embodiments avoids useless register transfer following general register contents switch and the fifth embodiment avoids useless register transfer when a register is updated to have the same value as the last one, thereby both reducing the volume of register transfer, as well as preventing useless re-execution on the slave thread side due to detection of a RAW offense.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. In a parallel processor system for executing a plurality of threads which are obtained by dividing a single program in parallel to each other by a plurality of processors, an interprocessor register succession method of taking a register updated in a master thread after forking over to a slave thread, comprising the steps of:
   after forking, at every write to a general register in the master thread, transmitting an updated register value from a processor on the master thread side to a processor on the slave thread side, and
   executing the slave thread for speculation in the processor on the slave thread side to conduct re-execution when an offense against Read After Write (RAW) is detected.

2. The interprocessor register succession method as set forth in claim 1, comprising:
   a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein
   when the status register corresponding to the general register whose register value is transmitted from the processor on the master thread side holds the second state, occurrence of an offense against RAW is detected.

3. The interprocessor register succession method as set forth in claim 1, comprising:
   a mask bit which is operable by a special instruction to control halt and resumption of transfer to the slave thread and provided one-to-one corresponding to the general register, wherein
   at every write to the general register in the master thread after forking, only when the mask bit corresponding to the general register to which the write is made is at a transfer allowed state, an updated register value is transmitted from the processor on the master thread side to the processor on the slave thread side.

4. The interprocessor register succession method as set forth in claim 1, comprising:
   a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, and
   a mask bit which is operable by a special instruction to control halt and resumption of transfer to the slave thread and provided one-to-one corresponding to the general register, wherein at every write to the general register in the master thread after forking, only when the mask bit corresponding to the general register to which the write is made is at a transfer allowed state, an updated register value is transmitted from the processor on the master thread side to the processor on the slave thread side.

5. The interprocessor register succession method as set forth in claim 1, comprising:
   stack pointer preserving step of preserving a value of a stack pointer at the time of forking, and
   detection step of detecting coincidence between a current stack pointer value and a stack pointer value preserved in said stack pointer preserving step, wherein
   at every write to the general register of the master thread after forking, only when the general register to which the write is made is a function return value register and only when the general register to which the write is made is other register than the function return value register and coincidence is detected by said detection step, an updated register value is transmitted from the processor on the master thread side to the processor on the slave thread side.

6. The interprocessor register succession method as set forth in claim 1, comprising:

a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, stack pointer preserving step of preserving a value of a stack pointer at the time of forking, and detection step of detecting coincidence between a current stack pointer value and a stack pointer value preserved in said stack pointer preserving step, wherein at every write to the general register of the master thread after forking, only when the general register to which the write is made is a function return value register and only when the general register to which the write is made is other register than the function return value register and coincidence is detected by said detection step, an updated register value is transmitted from the processor on the master thread side to the processor on the slave thread side.

7. The interprocessor register succession method as set forth in claim 1, comprising:

a store address register one-to-one corresponding to each general register, wherein at the time of execution of a store instruction, a store address for each general register is stored in said store address register, at the detection of general register contents switch, transfer of the general register in question to the slave thread is inhibited and write to the store address register is halted, and an address at the time of loading is compared with the store address stored in the store address register to detect the contents of the general register being restored, thereby releasing the general register in question from the state where transfer to the slave thread is inhibited.

8. The interprocessor register succession method as set forth in claim 1, comprising:

a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, a store address register one-to-one corresponding to each general register, wherein at the time of execution of a store instruction, a store address for each general register is stored in said store address register, at the detection of general register contents switch, transfer of the general register in question to the slave thread is inhibited and write to the store address register is halted, and an address at the time of loading is compared with the store address stored in the store address register to detect the contents of the general register being restored, thereby releasing the general register in question from the state where transfer to the slave thread is inhibited.

9. The interprocessor register succession method as set forth in claim 1, wherein only when an updated general register value differs from a value yet to be updated, the updated register value is transmitted from the processor on the master thread side to the processor on the slave thread side.

10. The interprocessor register succession method as set forth in claim 1, comprising:

a status register provided one-to-one corresponding to a general register of each processor for holding a first state at the time of thread start, holding a second state when first access to the corresponding general register after the thread start is to read, and holding a third state when first access to the corresponding general register after the thread start is to write, wherein when the status register corresponding to the general register whose register value is transmitted from the processor on the master thread side holds the second state, occurrence of an offense against RAW is detected, and only when an updated general register value differs from a value yet to be updated, the updated register value is transmitted from the processor on the master thread side to the processor on the slave thread side.

11. In a parallel processor system for executing a plurality of threads which are obtained by dividing a single program in parallel to each other by a plurality of processors, an interprocessor register succession device for taking a register updated in a master thread after forking over to a slave thread, comprising:

means for transmitting an updated register value from a processor on the master thread side to a processor on the slave thread side at every write to a general register in the master thread after forking, and means for executing the slave thread for speculation in the processor on the slave thread side to conduct re-execution when an offense against RAW is detected.

12. The interprocessor register succession device as set forth in claim 11, wherein each processor comprising a status register provided one-to-one corresponding to a general register for holding a first state at the time of thread start, holding a second state when first access to the corresponding general register after the thread start is to read, and holding a third state when first access to the corresponding general register after the thread start is to write, and means for detecting, when the status register corresponding to the general register whose register value is transmitted from the processor on the master thread side holds the second state, occurrence of an offense against RAW.

13. The interprocessor register succession device as set forth in claim 11, wherein each processor comprising a mask bit which is operable by a special instruction to control halt and resumption of transfer to the slave thread and provided one-to-one corresponding to the general register, and means for transmitting an updated register value from the processor on the master thread side to the processor on the slave thread side at every write to the general register in the master thread after forking only when the mask bit corresponding to the general register to which the write is made is at a transfer allowed state.

14. The interprocessor register succession device as set forth in claim 11, wherein each processor comprising a status register provided one-to-one corresponding to a general register for holding a first state at the time of thread start, holding a second state when first access to the corresponding general register after the thread start is to read, and holding a third state when first access to the corresponding general register after the thread start is to write, detection means for detecting occurrence of an offense against RAW when the status register corresponding to the general register whose register value is transmitted from the processor on the master thread side holds the second state, a mask bit which is operable by a special instruction to control halt and resumption of transfer to the slave thread and provided one-to-one corresponding to the general register, and means for transmitting an updated register value from the processor on the master thread side to the processor on the slave thread side at every write to the general register in the master thread after forking, only when the mask bit corresponding to the general register to which the write is made is at a transfer allowed state.

15. The interprocessor register succession device as set forth in claim 11, wherein each processor comprising stack pointer preserving means for preserving a value of a stack pointer at the time of forking, detection means for detecting coincidence between a current stack pointer value and a stack pointer value preserved in said stack pointer preserving means, and means for transmitting an updated register value from the processor on the master thread side to the processor on the slave thread side at every write to the general register of the master thread after forking, only when the general register to which the write is made is a function return value register and only when the general register to which the write is made is other register than the function return value register and coincidence is detected by said detection means.

16. The interprocessor register succession device as set forth in claim 11, wherein each processor comprising a status register provided one-to-one corresponding to a general register for holding a first state at the time of thread start, holding a second state when first access to the corresponding general register after the thread start is to read, and holding a third state when first access to the corresponding general register after the thread start is to write, detection means for detecting occurrence of an offense against RAW when the status register corresponding to the general register whose register value is transmitted from the processor on the master thread side holds the second state, stack pointer preserving means for preserving a value of a stack pointer at the time of forking, detection means for detecting coincidence between a current stack pointer value and a stack pointer value preserved in said stack pointer preserving means, and means for transmitting an updated register value from the processor on the master thread side to the processor on the slave thread side at every write to the general register of the master thread after forking, only when the general register to which the write is made is a function return value register and only when the general register to which the write is made is other register than the function return value register and coincidence is detected by said detection means.

17. The interprocessor register succession device as set forth in claim 11, wherein each processor comprising a store address register one-to-one corresponding to each general register, means for storing a store address for each general register in said store address register at the time of execution of a store instruction, means for inhibiting transfer of the general register in question to the slave thread and halting write to the store address register at the detection of general register contents switch, and means for comparing an address at the time of loading with the store address stored in the store address register to detect the contents of the general register being restored, thereby releasing the general register in question from the state where transfer to the slave thread is inhibited.

18. The interprocessor register succession device as set forth in claim 11, wherein each processor comprising a status register provided one-to-one corresponding to a general register for holding a first state at the time of thread start, holding a second state when first access to the corresponding general register after the thread start is to read, and holding a third state when first access to the corresponding general register after the thread start is to write, detection means for detecting occurrence of an offense against RAW when the status register corresponding to the general register whose register value is transmitted from the processor on the master thread side holds the second state, a store address register one-to-one corresponding to each general register, means for storing a store address for each general register in said store address register at the time of execution of a store instruction, means for, at the detection of contents switch of the general register, inhibiting transfer of the general register in question to the slave thread and halting write to the store address register, and means for comparing an address at the time of loading with the store address stored in the store address register to detect the contents of the general register being restored, thereby releasing the general register in question from the state where transfer to the slave thread is inhibited.

19. The interprocessor register succession device as set forth in claim 11, comprising means for detecting whether an updated value of the general register is different from a value yet to be updated, and means for transmitting an updated register value from the processor on the master thread side to the processor on the slave thread side only when the updated general register value differs from the value yet to be updated.

20. In a parallel processor system for executing a plurality of threads which are obtained by dividing a single program in parallel to each other by a plurality of processors, an interprocessor register succession device for taking a register updated in a master thread after forking over to a slave thread, comprising:

unit which transmits an updated register value from a processor on the master thread side to a processor on the slave thread side at every write to a general register in the master thread after forking, and unit which executes the slave thread for speculation in the processor on the slave thread side to conduct re-execution when an offense against RAW is detected.

21. The interprocessor register succession device as set forth in claim 20, wherein each processor comprising a status register provided one-to-one corresponding to a general register which holds a first state at the time of thread start, holds a second state when first access to the corresponding general register after the thread start is to read, and holds a third state when first access to the corresponding general register after the thread start is to write, and unit which detects, when the status register corresponding to the general register whose register value is transmitted from the processor on the master thread side holds the second state, occurrence of an offense against RAW.

22. The interprocessor register succession device as set forth in claim 20, wherein each processor comprising a mask bit which is operable by a special instruction to control halt and resumption of transfer to the slave thread and provided one-to-one corresponding to the general register, and unit which transmits an updated register value from the processor on the master thread side to the processor on the slave thread side at every write to the general register in the master thread after forking only when the mask bit corresponding to the general register to which the write is made is at a transfer allowed state.

23. The interprocessor register succession device as set forth in claim 20, wherein each processor comprising a status register provided one-to-one corresponding to a general register which holds a first state at the time of thread start, holds a second state when first access to the corresponding general register after the thread start is to read, and holds a third state when first access to the corresponding general register after the thread start is to write, detection unit which detects occurrence of an offense against RAW when the status register corresponding to the general register whose register value is transmitted from the processor on the master thread side holds the second state, a mask bit which is operable by a special instruction to control halt and resumption of transfer to the slave thread and provided one-to-one corresponding to the general register, and unit which transmits an updated register value from the processor on the master thread side to the processor on the slave thread side at every write to the general register in the master thread after forking, only when the mask bit corresponding to the general register to which the write is made is at a transfer allowed state.

24. The interprocessor register succession device as set forth in claim 20, wherein each processor comprising stack pointer preserving unit which preserves a value of a stack pointer at the time of forking, detection unit which detects coincidence between a current stack pointer value and a stack pointer value preserved in said stack pointer preserving unit, and unit which transmits an updated register value from the processor on the master thread side to the processor on the slave thread side at every write to the general register of the master thread after forking, only when the general register to which the write is made is a function return value register and only when the general register to which the write is made is other register than the function return value register and coincidence is detected by said detection unit.

25. The interprocessor register succession device as set forth in claim 20, wherein each processor comprising a status register provided one-to-one corresponding to a general register which holds a first state at the time of thread start, holds a second state when first access to the corresponding general register after the thread start is to read, and holds a third state when first access to the corresponding general register after the thread start is to write, detection unit which detects occurrence of an offense against RAW when the status register corresponding to the general register whose register value is transmitted from the processor on the master thread side holds the second state, stack pointer preserving unit which preserves a value of a stack pointer at the time of forking, detection unit which detects coincidence between a current stack pointer value and a stack pointer value preserved in said stack pointer preserving unit, and unit which transmits an updated register value from the processor on the master thread side to the processor on the slave thread side at every write to the general register of the master thread after forking, only when the general register to which the write is made is a function return value register and only when the general register to which the write is made is other register than the function return value register and coincidence is detected by said detection unit.

26. The interprocessor register succession device as set forth in claim 20, wherein each processor comprising a store address register one-to-one corresponding to each general register, unit which stores a store address for each general register in said store address register at the time of execution of a store instruction, unit which inhibits transfer of the general register in question to the slave thread and halting write to the store address register at the detection of general register contents switch, and unit which compares an address at the time of loading with the store address stored in the store address register to detect the contents of the general register being restored, thereby releases the general register in question from the state where transfer to the slave thread is inhibited.

27. The interprocessor register succession device as set forth in claim 20, wherein each processor comprising a status register provided one-to-one corresponding to a general register which holds a first state at the time of thread start, holds a second state when first access to the corresponding general register after the thread start is to read, and holds a third state when first access to the corresponding general register after the thread start is to write, detection unit which detects occurrence of an offense against RAW when the status register corresponding to the general register whose register value is transmitted from the processor on the master thread side holds the second state, a store address register one-to-one corresponding to each general register, unit which stores a store address for each general register in said store address register at the time of execution of a store instruction, at the detection of contents switch of the general register, unit which inhibits transfer of the general register in question to the slave thread and halting write to the store address register, and unit which compares an address at the time of loading with the store address stored in the store address register to detect the contents of the general register being restored, thereby releasing the general register in question from the state where transfer to the slave thread is inhibited.

28. The interprocessor register succession device as set forth in claim 20, comprising unit which detects whether an updated value of the general register is different from a value yet to be updated, and unit which transmits an updated register value from the processor on the master thread side to the processor on the slave thread side only when the updated general register value differs from the value yet to be updated.

* * * * *